United States Patent
Kim et al.

(10) Patent No.: US 9,350,846 B2
(45) Date of Patent: May 24, 2016

(54) MOBILE TERMINAL AND CONTROLLING METHOD THEREOF

(71) Applicant: LG ELECTRONICS INC., Seoul (KR)

(72) Inventors: Taeho Kim, Seoul (KR); Kyoungju Lee, Seoul (KR); Kibong Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/534,940

(22) Filed: Nov. 6, 2014

(65) Prior Publication Data
US 2015/0126247 A1    May 7, 2015

(30) Foreign Application Priority Data
Nov. 7, 2013  (KR) .................. 10-2013-0134856
Nov. 14, 2013 (KR) .................. 10-2013-0138280

(51) Int. Cl.
| | | |
|---|---|---|
| *H04M 1/00* | (2006.01) | |
| *H04M 1/60* | (2006.01) | |
| *H04M 1/05* | (2006.01) | |
| *H04M 1/27* | (2006.01) | |

(52) U.S. Cl.
CPC .......... *H04M 1/6041* (2013.01); *H04M 1/05* (2013.01); *H04M 1/271* (2013.01); *H04M 1/6066* (2013.01); *H04M 2250/74* (2013.01)

(58) Field of Classification Search
CPC ... H04M 1/6066; H04M 1/05; H04M 1/6058; H04M 1/72522; H04M 1/72527; H04M 1/7253; H04M 1/72519; H04M 1/0214; H04B 1/385; H04B 1/3888; H04B 1/3833; H04W 88/02
USPC ............ 455/556.1, 557, 550.1, 575.1, 575.2, 455/575.6, 90.2, 90.3
See application file for complete search history.

(56) References Cited

U.S. PATENT DOCUMENTS

| | | | | |
|---|---|---|---|---|
| 7,512,417 | B2* | 3/2009 | Cheng ................ | H04M 1/0202 379/420.02 |
| 7,720,234 | B1* | 5/2010 | Winslow .............. | H04R 5/023 379/430 |
| 8,073,137 | B2* | 12/2011 | Weinans ............ | H04M 1/6066 379/433.06 |
| 8,249,547 | B1* | 8/2012 | Fellner .............. | G08B 21/0446 455/404.1 |
| 2011/0034134 | A1 | 2/2011 | Henderson | |
| 2015/0358450 | A1* | 12/2015 | Ushakov .............. | H04B 1/385 455/575.2 |

FOREIGN PATENT DOCUMENTS

EP    2 133 773 A1    12/2009

OTHER PUBLICATIONS

European Search Report issued in Application No. 14191826.8 dated Mar. 13, 2015.

* cited by examiner

*Primary Examiner* — Nhan Le
(74) *Attorney, Agent, or Firm* — KED & Associates LLP

(57) ABSTRACT

A mobile terminal and controlling method may be provided. The mobile terminal may include a microphone, a necklace strap, a pendant part sliding to move along the necklace strap by being coupled with the necklace strap, a sensing unit detecting a location of the pendant part in accordance with a slide movement of the pendant part, and a controller to recognize a voice command received through the microphone. The controller may perform a first function in response to a first voice command recognized through the microphone if the detected location of the pendant part belongs to a first range. The controller may perform a second function in response to the first voice command recognized through the microphone if the detected location of the pendant part belongs to a second range.

22 Claims, 38 Drawing Sheets

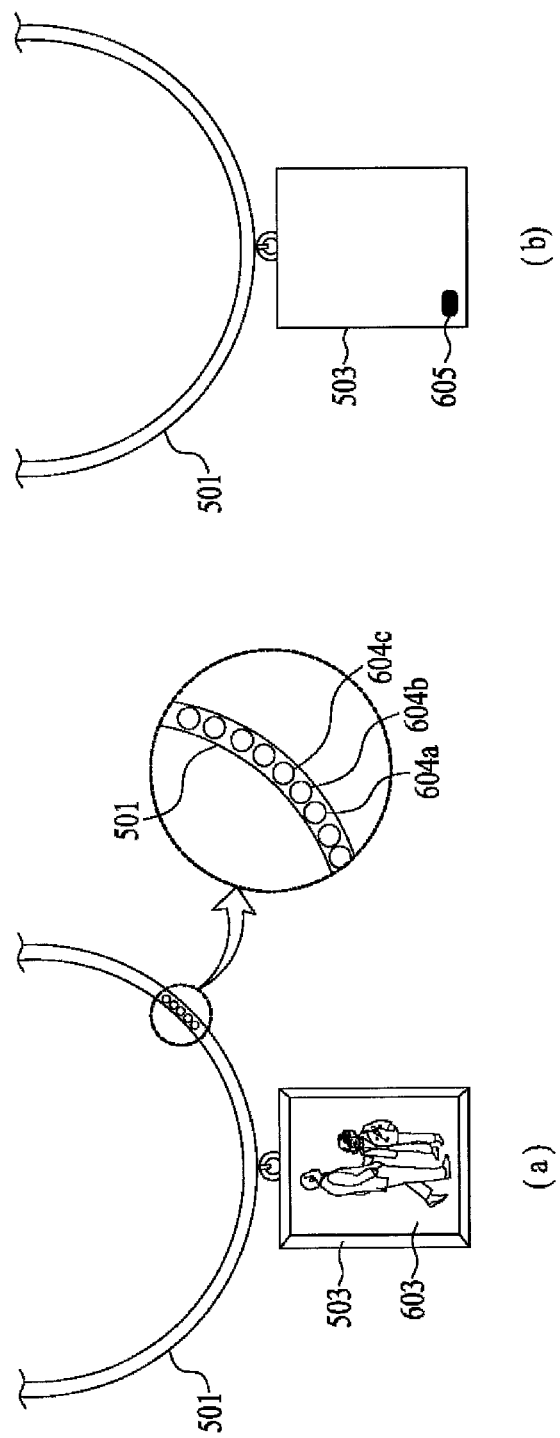

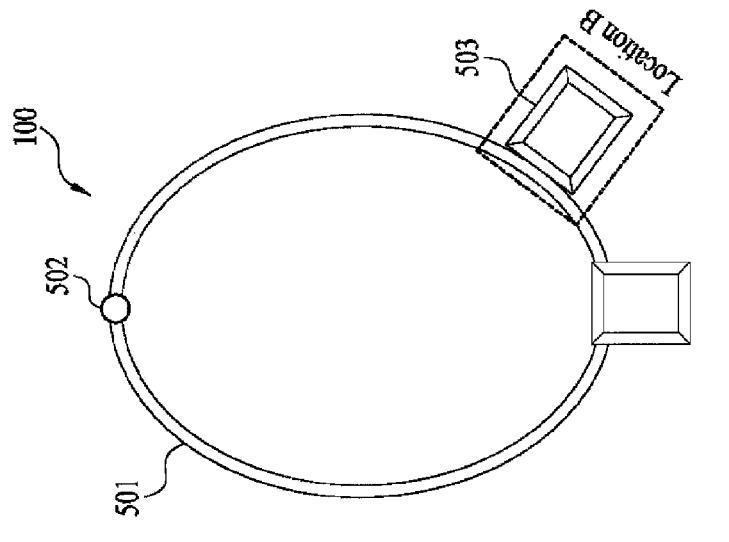
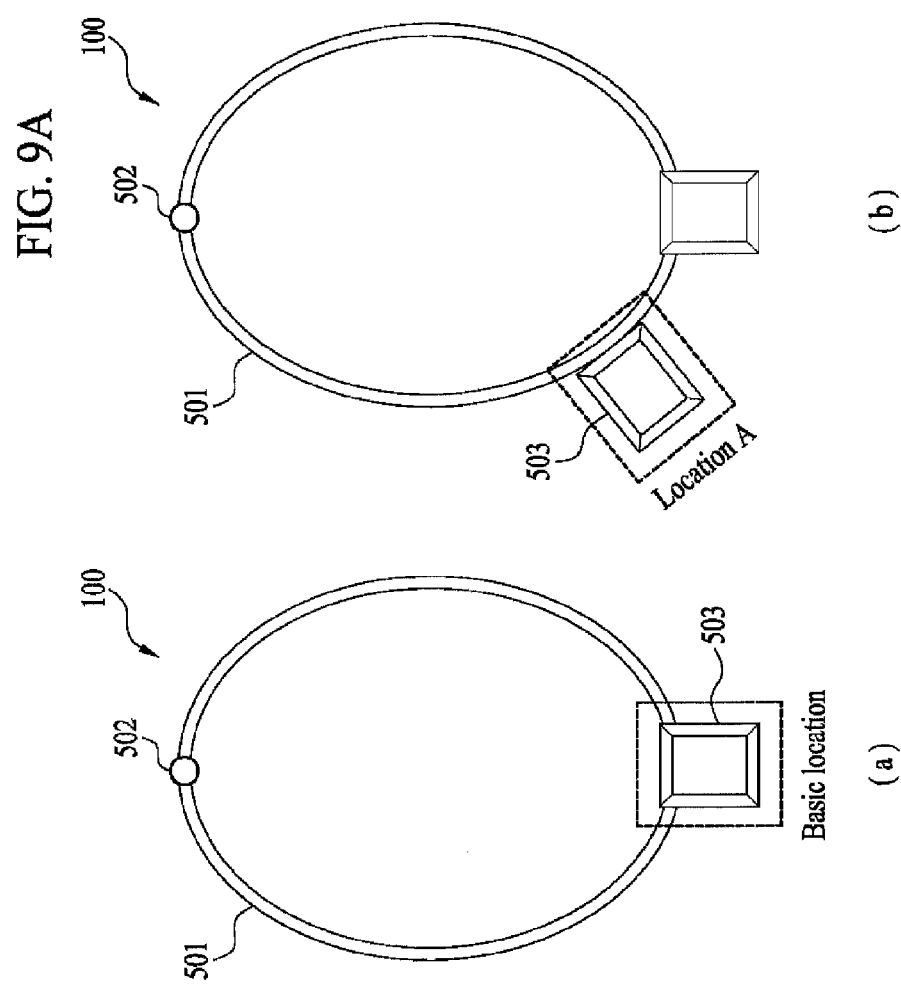
FIG. 9A

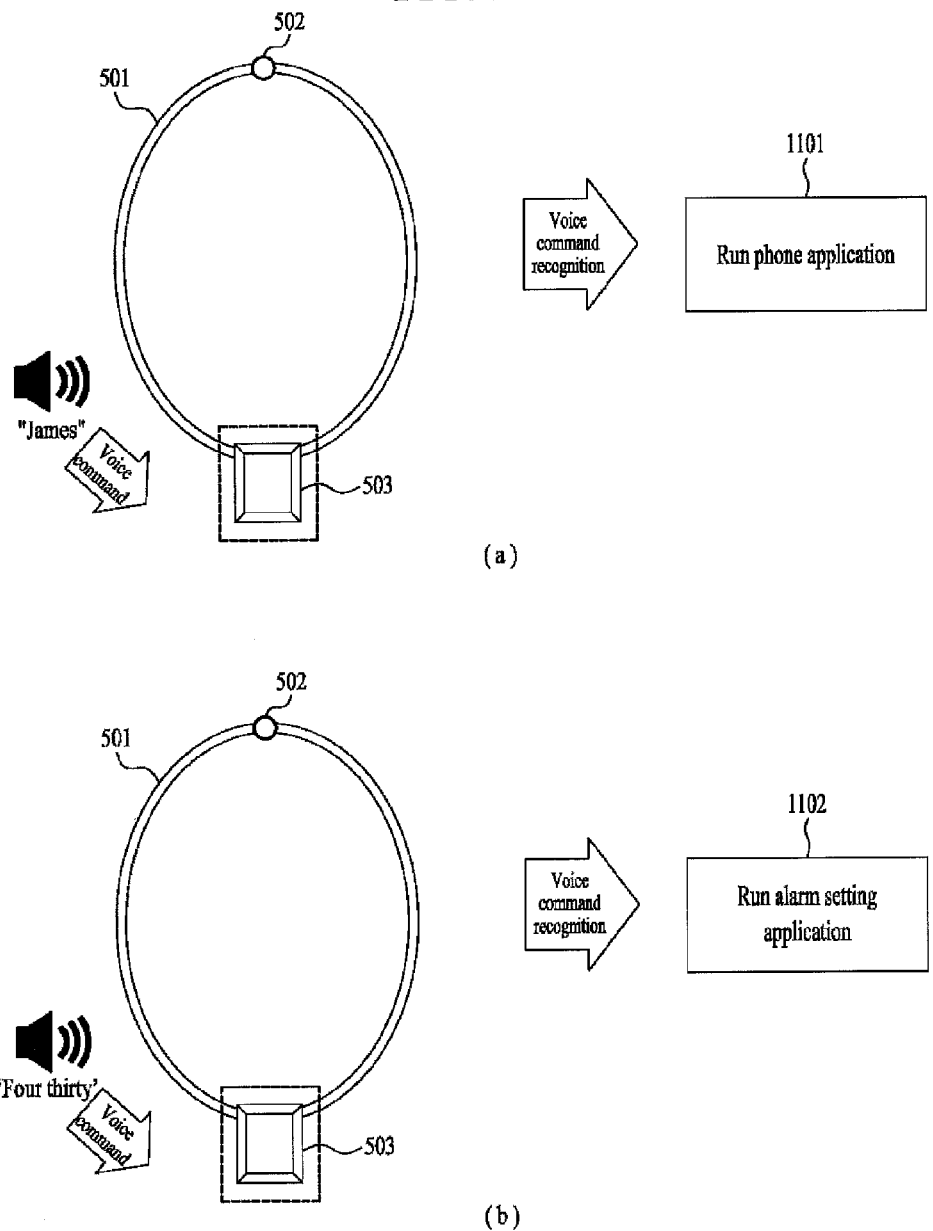

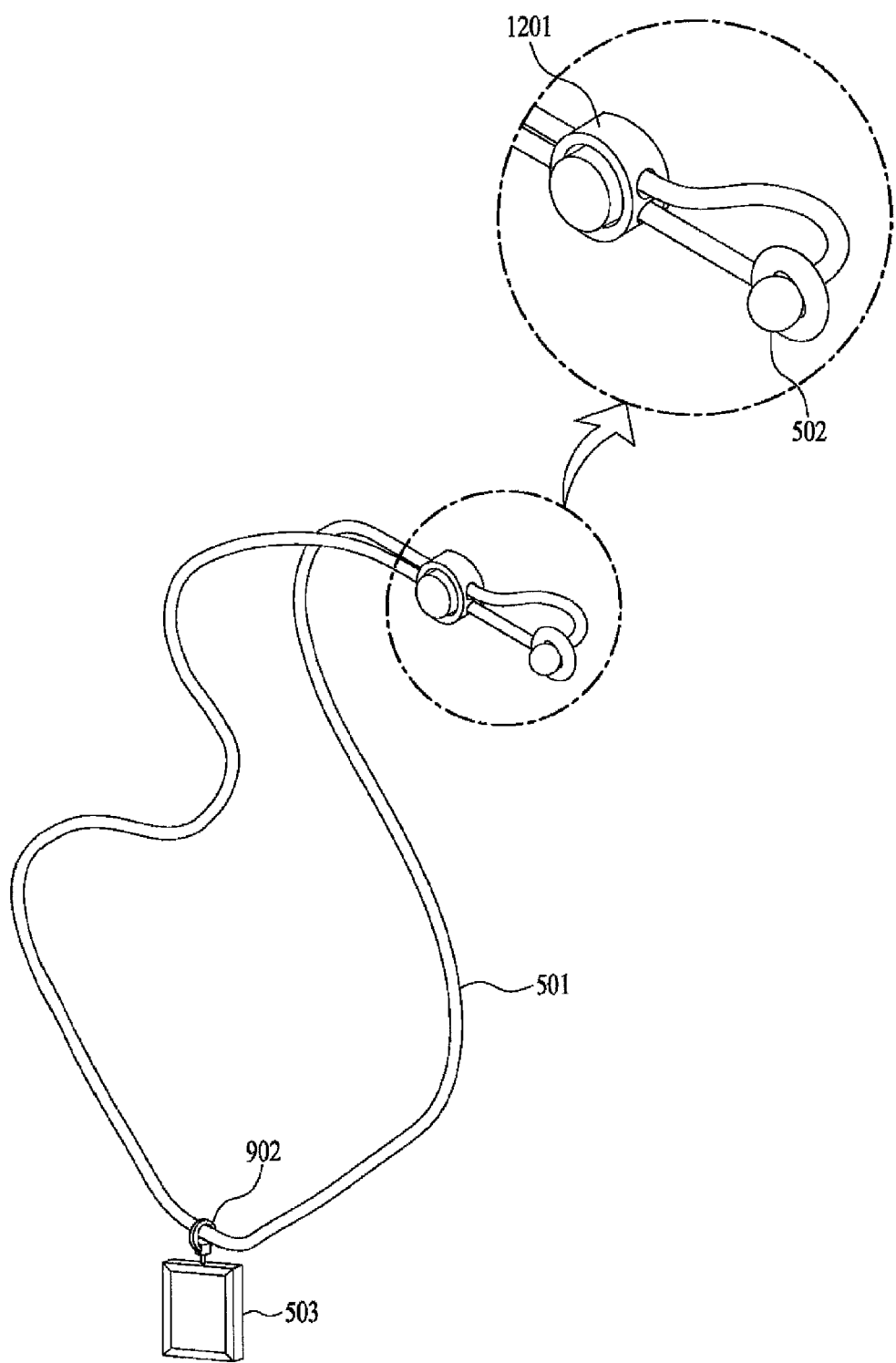

FIG. 14A
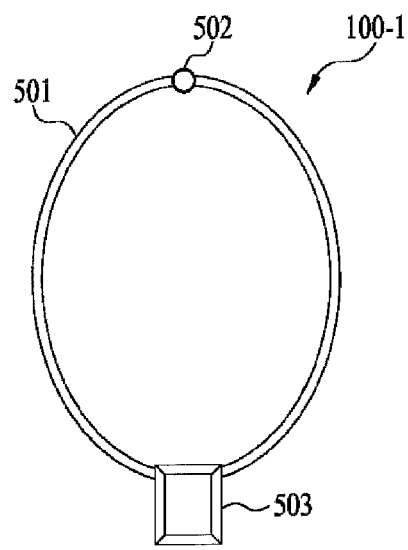
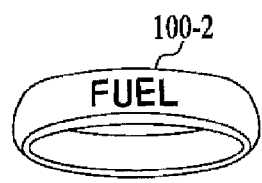
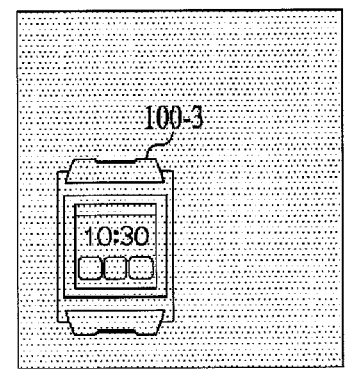
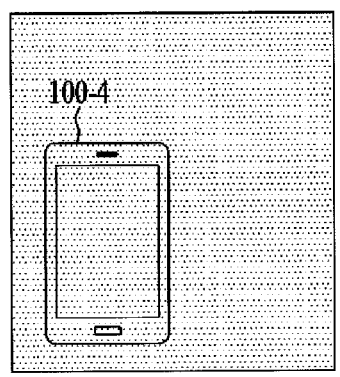
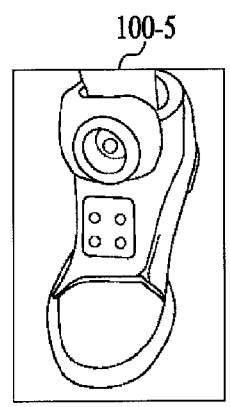

FIG. 15
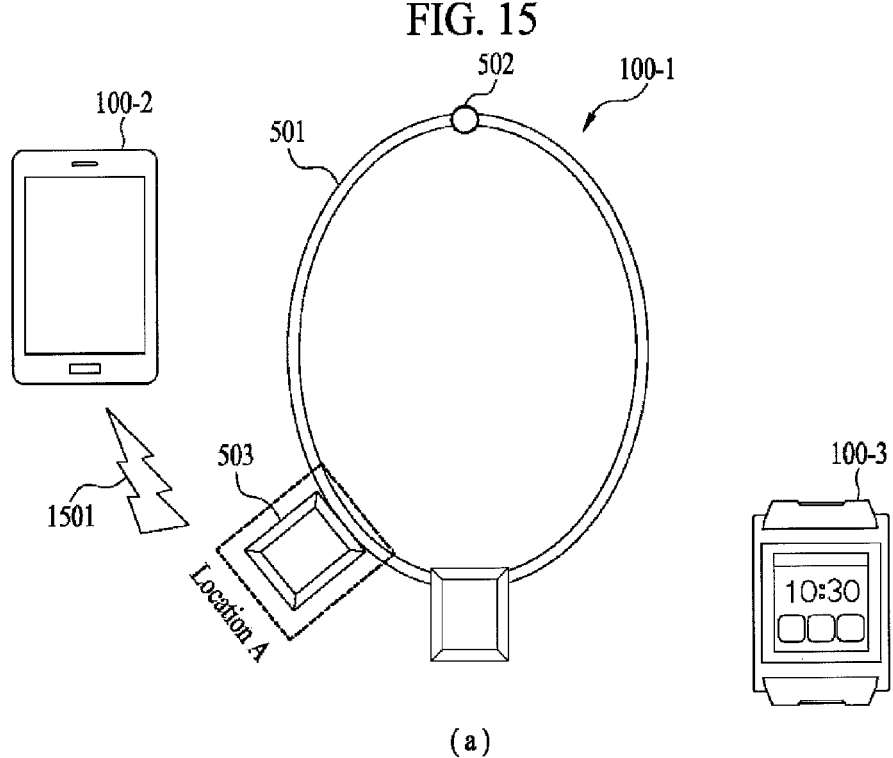
(a)
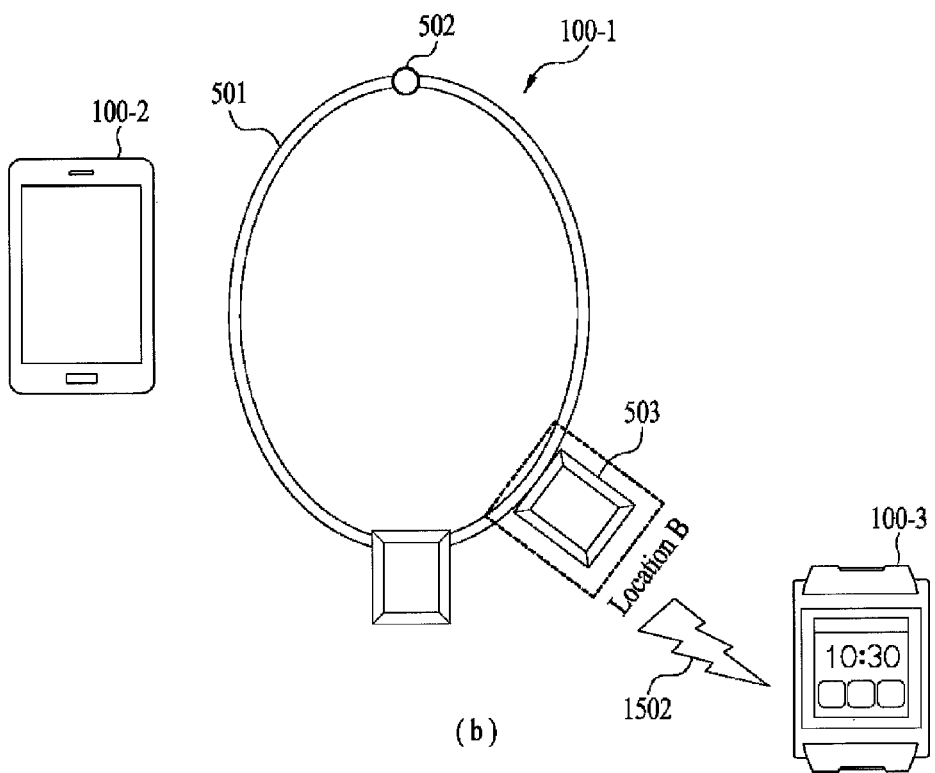
(b)

FIG. 18
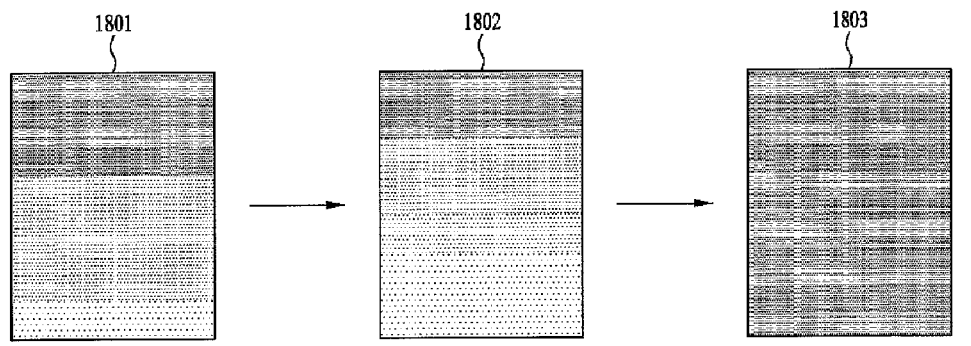
In case of voice recognition failure, color change of pendant
(a)
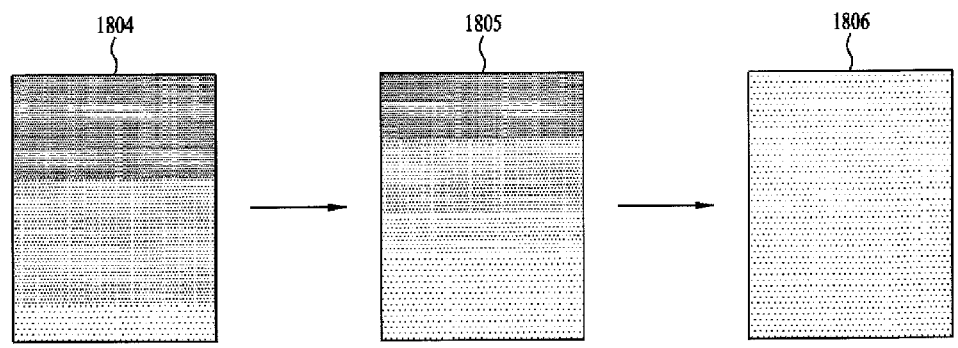
In case of voice recognition success, color change of pendant
(b)

FIG. 19A
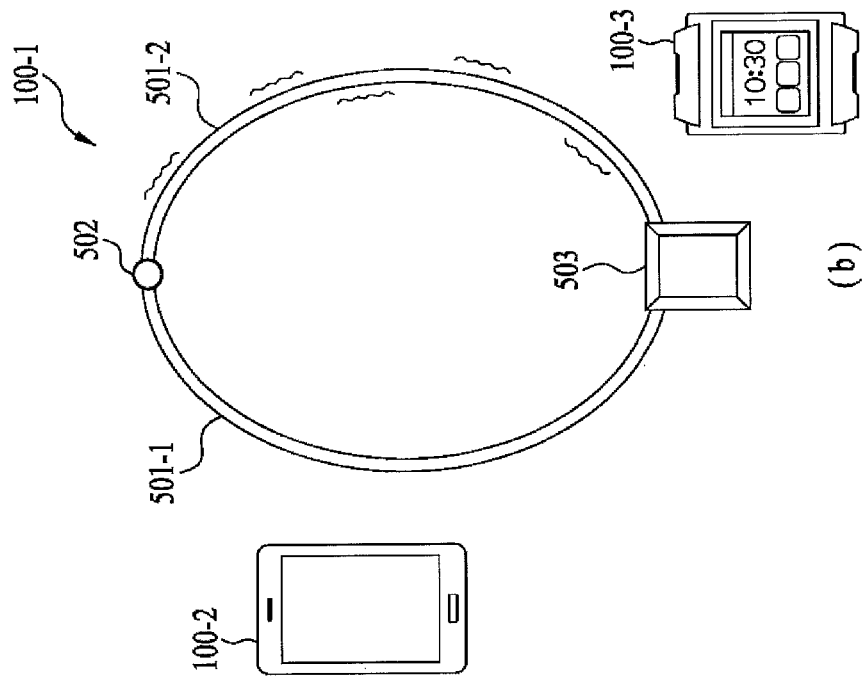
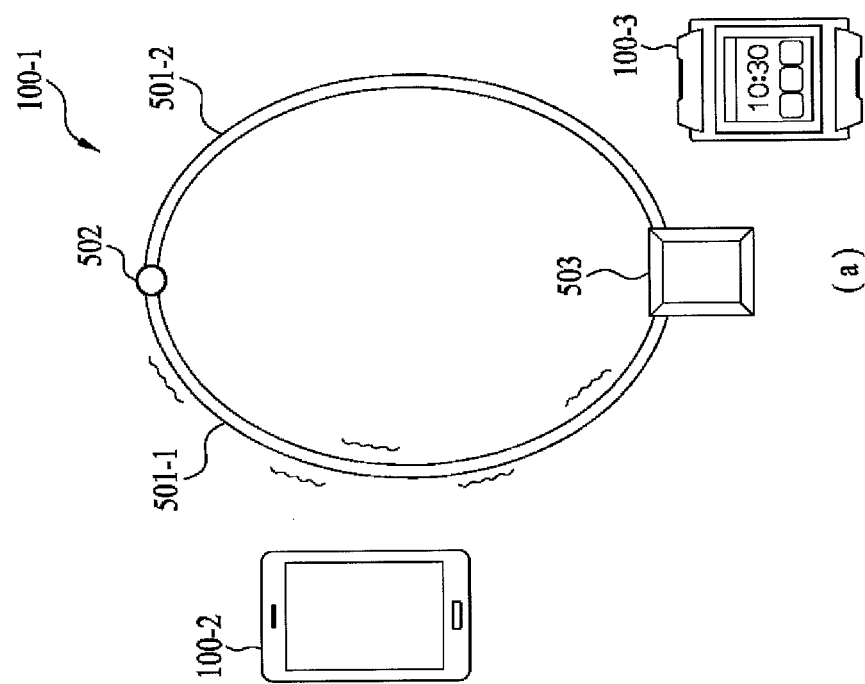

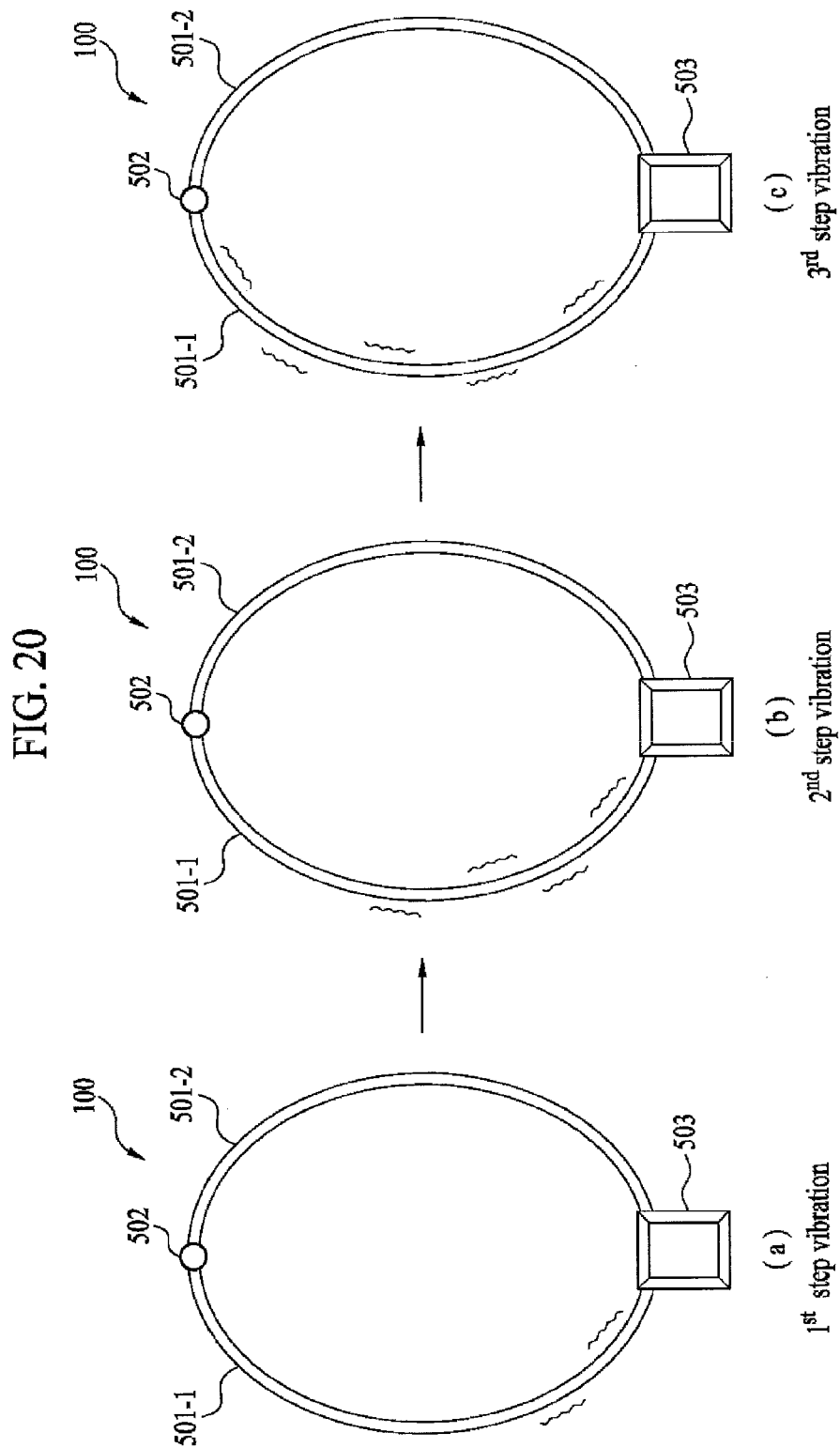

FIG. 25
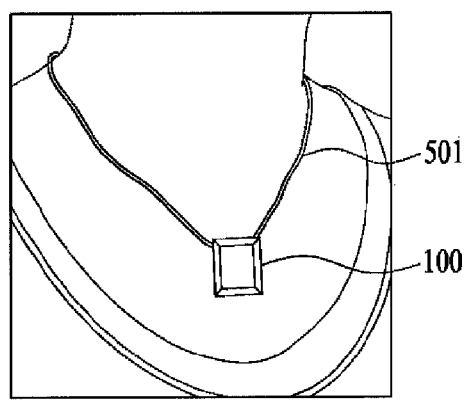
(a)
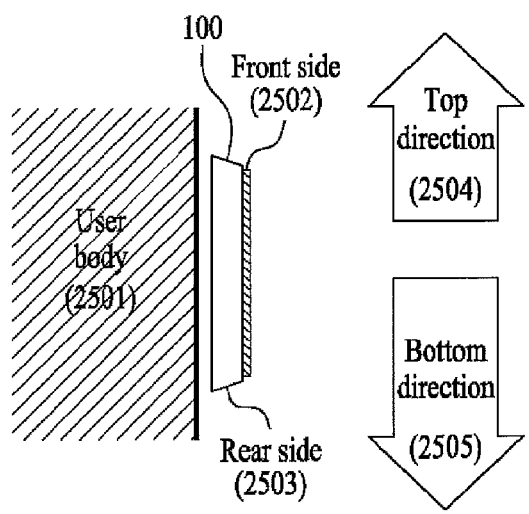
(b)

FIG. 27
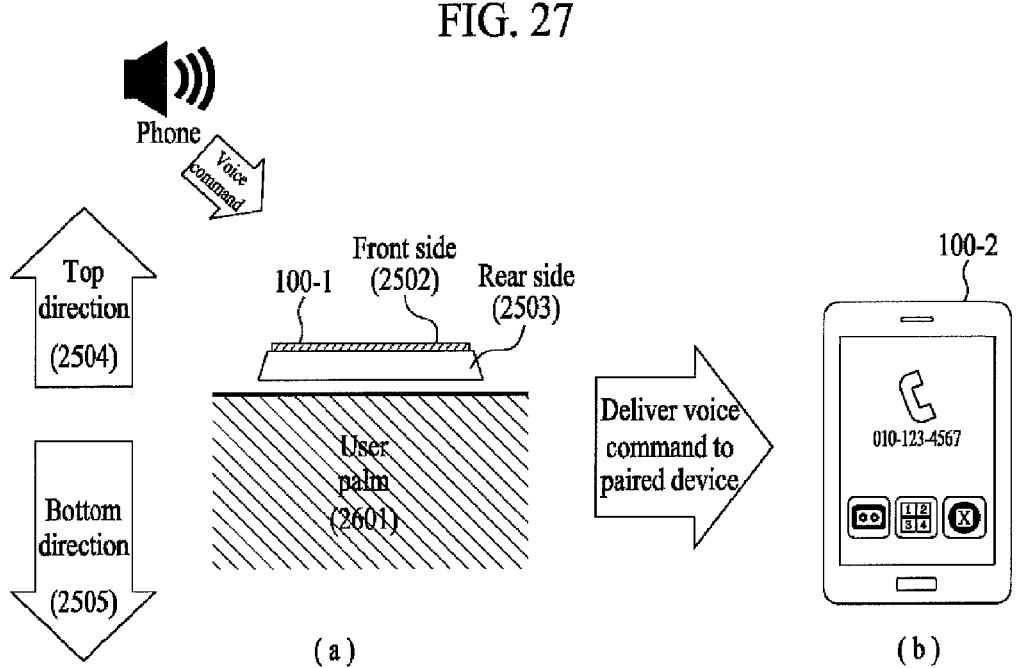
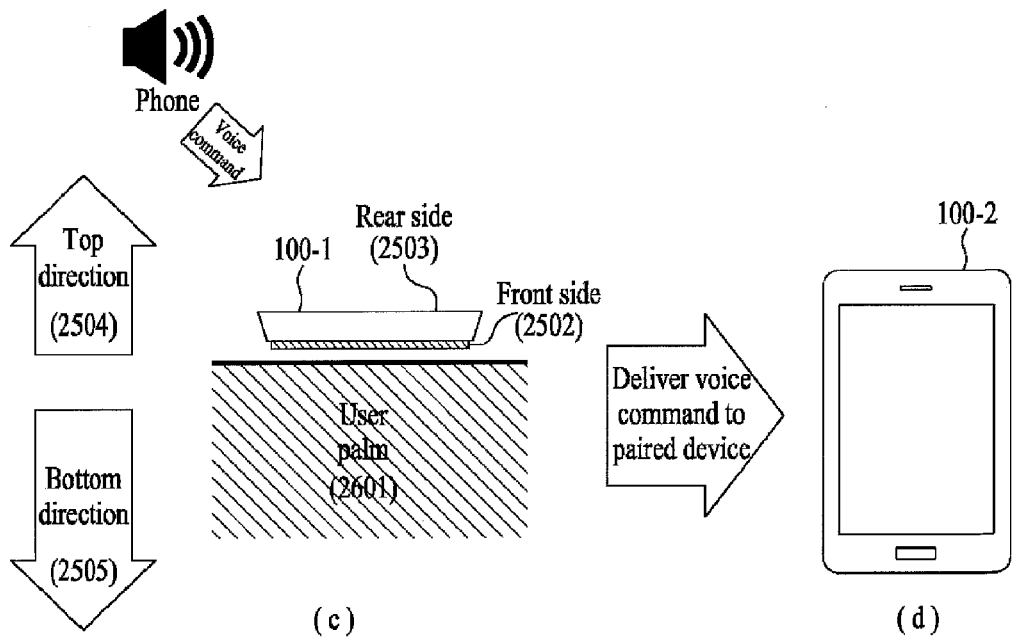

MOBILE TERMINAL AND CONTROLLING METHOD THEREOF

CROSS-REFERENCE TO RELATED APPLICATIONS

This application claims the benefit and priority from Korean Patent Application No. 10-2013-0134856 filed Nov. 7, 2013 and Korean Patent Application No. 10-2013-0138280, filed Nov. 14, 2013, the subject matters of which are hereby incorporated by reference.

BACKGROUND

1. Field

Embodiments may relate to a mobile terminal, and more particularly, to a mobile terminal and controlling method thereof.

2. Background

A mobile terminal is a device that may be configured to perform various functions. Examples of such functions include data and voice communications, capturing images and video via a camera, recording audio, playing music files and outputting music via a speaker system, and displaying images and video on a display. Some terminals include additional functionality that supports game playing, while other terminals are also configured as multimedia players. More recently, mobile terminals have been configured to receive broadcast and multicast signals that permit viewing of contents, such as videos and television programs.

Terminals maybe classified into mobile terminals and stationary terminals according to a presence or non-presence of mobility. The mobile terminals may be further classified into handheld terminals and vehicle mount terminals according to availability for hand-carry.

There are ongoing efforts to support and increase functionality of mobile terminals. Such efforts include software and hardware improvements, as well as changes and improvements in structural components that form the mobile terminal.

The mobile terminal market may attempt to develop mobile terminals of various types to meet diversity of consumer's needs. The types of the developed mobile terminals may be focused on a configuration that can emphasize portability of the mobile terminal. The mobile terminal types for high portability can include a type wearable on a user's body, such as a watch type, a glasses type, a necklace type and the like. These types of mobile terminals exist in case of having difficulty in applying the input/output means in the same manner. For example, since these mobile terminals have a display size relatively smaller than that of a mobile terminal of an existing type, it may be necessary to consider a different kind of an output means. In case of a method for recognizing a user's voice command and then utilizing a result of the recognition as an input means, as a user's voice command becomes longer, it may be highly probable that a recognition rate gets lower. Moreover, since this voice command may reveal a user's intention, it may require for improvement. Thus, there may be a demand for a new method for a user input means for inputting a user's voice command more accurately without easily revealing a user's intention. It may be desirable to research and develop a new type of an input/output method applicable to a mobile terminal as well as a voice command technique and/or structure.

BRIEF DESCRIPTION OF THE DRAWINGS

Arrangements and embodiments maybe described in detail with reference to the following drawings in which like reference numerals refer to like elements and wherein:

FIG. 6 is a diagram for one example of front and rear sides of a mobile terminal of a necklace type according to one example embodiment;

FIGS. 9a to 9e are diagrams for a mechanical structure of a pendant part and a necklace strap and a relative location in a mobile terminal of a necklace type having the pendant part according to one example embodiment;

FIG. 11 is a diagram for one example of a method of classifying a type of an application activated in response to a format of an inputted voice command according to one example embodiment;

FIG. 12a and FIG. 12b are diagrams for a classification of an operating mode depending on a length adjustment of a necklace strap and a structure of a length adjusting part for adjusting the necklace strap according to one example embodiment;

FIGS. 14a and 14b are a diagram for one example of a method of classifying a type of an external device connected in response to a classified mode according to one example embodiment;

FIG. 15 is a diagram for one example of a method of specifying one of a plurality of other mobile terminals connected to a mobile terminal according to one example embodiment;

FIG. 18 is a diagram for one example of a method of showing a success/failure in voice recognition to a user according to one example embodiment;

FIG. 19a and FIG. 19b are diagrams for one example of a feedback method using vibration of a necklace strap in a necklace type mobile terminal according to one example embodiment;

FIG. 20 is a diagram for one example of a method of adjusting a range of vibration of a necklace strap in proportion to a size of information intended to be guided to a user according to one example embodiment;

FIG. 25 and FIG. 26 are diagrams for a method of detecting an inclination of a mobile terminal and then reducing waste of power consumption based on a result of the detection according to one example embodiment;

FIG. 27 is a diagram for one example of a method of performing a different function depending on whether a front or rear side of a mobile terminal faces upward according to one example embodiment;

DETAILED DESCRIPTION

In the following detailed description, reference is made to the accompanying drawing figures that form a part hereof, and that show by way of illustration specific embodiments. It is to be understood by those of ordinary skill in this technological field that other embodiments may be utilized, and structural, electrical, as well as procedural changes may be made without departing from the scope of the embodiments. Wherever possible, the same reference numbers maybe used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Embodiments may be applicable to a various types of terminals. Examples of such terminals may include mobile terminals, such as mobile phones, user equipment, smart phones, mobile computers, digital broadcast terminals, personal digital assistants, portable multimedia players (PMP) and/or navigators.

Figure 1:
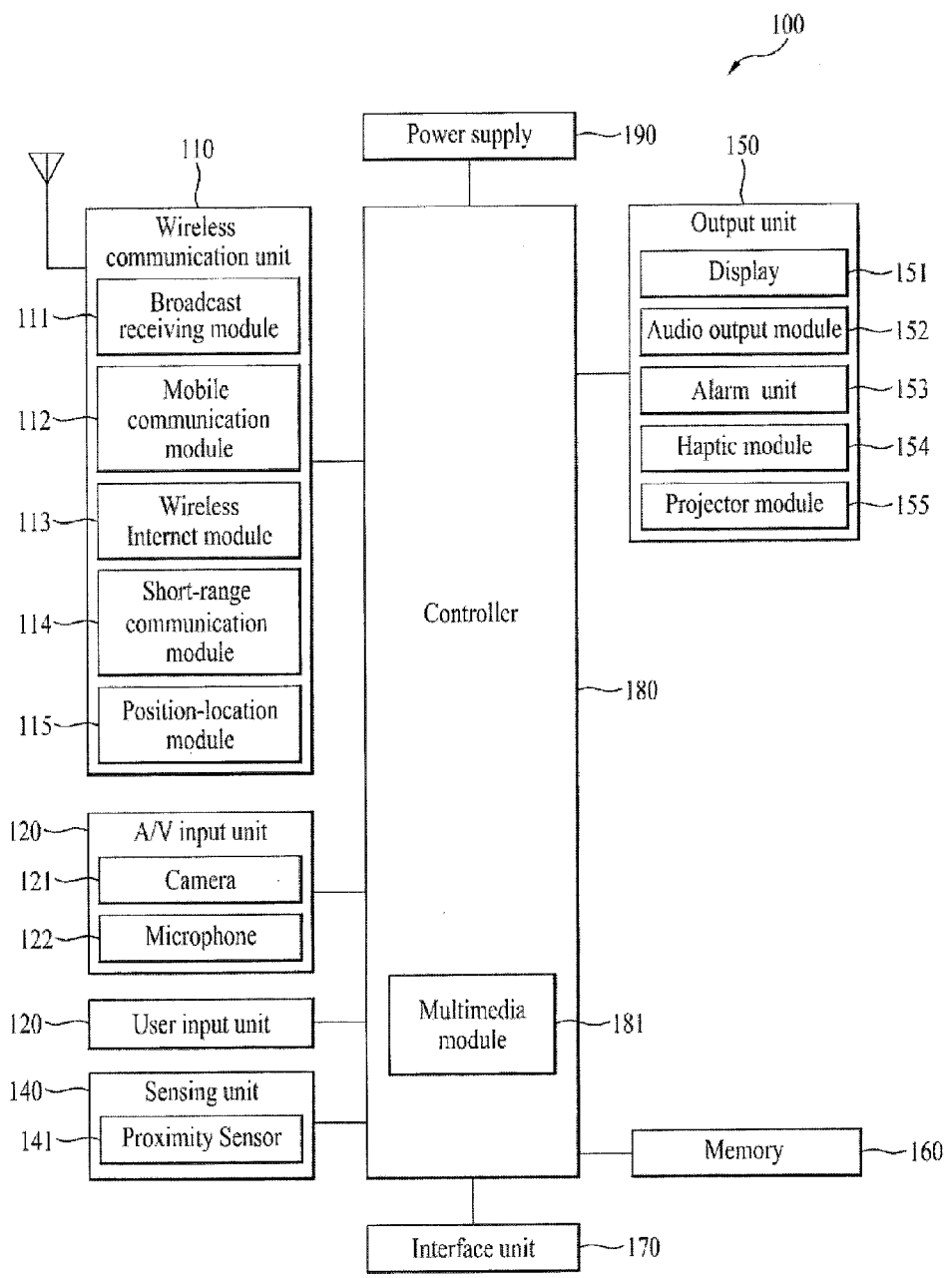
FIG. 1 is a block diagram of a mobile terminal according to one example embodiment.

FIG. 1 is a block diagram of a mobile terminal 100 in accordance with an example embodiment. FIG. 1 shows the mobile terminal 100 includes a wireless communication unit 110, an A/V (audio/video) input unit 120, a user input unit 130, a sensing unit 140, an output unit 150, a memory 160, an interface unit 170, a controller 180, a power supply (or power supply unit) 190 and the like. FIG. 1 shows the mobile terminal 100 having various components, although it is understood that implementing all of the illustrated components is not a requirement. Greater or fewer components may alternatively be implemented.

In the following description, the above elements of the mobile terminal 100 may be explained.

The wireless communication unit 110 may include one or more components that permit wireless communication between the mobile terminal 100 and a wireless communication system or network within which the mobile terminal 100 is located. For example, the wireless communication unit 110 can include a broadcast receiving module 111, a mobile communication module 112, a wireless internet module 113, a short-range communication module 114, a position-location module 115 and/or the like.

The broadcast receiving module 111 may receive a broadcast signal and/or broadcast associated information from an external broadcast managing server via a broadcast channel.

The broadcast channel may include a satellite channel and a terrestrial channel.

The broadcast managing server may refer to a server that generates and transmits a broadcast signal and/or broadcast associated information or a server that is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information may include information associated with a broadcast channel, a broadcast program, a broadcast service provider, etc. The broadcast associated information can be provided via a mobile communication network. In this example, the broadcast associated information can be received by the mobile communication module 112.

The broadcast associated information can be implemented in various forms. For example, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). The broadcast receiving module 111 maybe configured suitable for other broadcasting systems as well as the above-described digital broadcasting systems.

The broadcast signal and/or broadcast associated information received by the broadcast receiving module 111 may be stored in a suitable device, such as a memory 160.

The mobile communication module 112 may transmit/receive wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 may support Internet access for the mobile terminal 100. This module may be internally or externally coupled to the mobile terminal 100. In this example, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE and/or the like may be achieved via a mobile communication network. In this aspect, the wireless internet module 113 configured to perform the wireless internet access via the mobile communication network can be understood as a part of the mobile communication module 112.

The short-range communication module 114 may facilitate relatively short-range communications. Suitable technologies for implementing this module may include radio frequency identification (RFID), infrared data association (IrDA), ultra-wideband (UWB), as well as the networking technologies commonly referred to as Bluetooth and ZigBee, to name a few.

The position-location module 115 may identify or otherwise obtain the location (or position) of the mobile terminal 100. This module may be implemented with a global positioning system (GPS) module.

According to current technology, the position-location module 115 (or GPS module) may be able to precisely calculate current 3-dimensional position information based on at least one of longitude, latitude and altitude and direction (or orientation) by calculating distance information and precise time information from at least three satellites and then applying triangulation to the calculated information. Location and time informations may be calculated using three satellites, and errors of the calculated location position and time informations are then amended using another satellite. The position-location module (or GPS module) 115 may calculate speed information by continuously calculating a real-time current location.

The audio/video (A/V) input unit 120 is configured to provide audio or video signal input to the mobile terminal 100. As shown, the A/V input unit 120 includes a camera 121 and a microphone 122. The camera 121 may receive and process image frames of still pictures or video that are obtained by an image sensor in a video call mode or a photographing mode. The processed image frames can be displayed on the display 151.

The image frames processed by the camera 121 can be stored in the memory 160 or can be externally transmitted via the wireless communication unit 110. At least two cameras 121 can be provided to the mobile terminal 100 according to environment of usage.

The microphone 122 may receive an external audio signal while the portable device is in a particular mode, such as a phone call mode, a recording mode and a voice recognition. This audio signal may be processed and converted into electric audio data. The processed audio data may be transformed into a format transmittable to a mobile communication base station via the mobile communication module 112 in case of a call mode. The microphone 122 may include assorted noise removing algorithms to remove (or lessen) noise generated in the course of receiving the external audio signal.

The user input unit 130 may generate input data responsive to user manipulation of an associated input device or devices. Examples of such devices include a keypad, a dome switch, a touchpad (e.g., static pressure/capacitance), a jog wheel, a jog switch, etc.

The sensing unit 140 may provide sensing signals for controlling operations of the mobile terminal 100 using status measurements of various aspects of the mobile terminal. For example, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. The sensing unit 140 can include a proximity sensor 141.

The output unit 150 may generate outputs relevant to senses of sight, hearing, touch and/or the like. The output unit 150 may include the display 151 (or display unit), an audio output module 152, an alarm unit 153, a haptic module 154, a projector module 155 and/or the like.

The display 151 may be implemented to visually display (output) information associated with the mobile terminal 100. For example, if the mobile terminal is operating in a phone call mode, the display may provide a user interface (UI) or graphical user interface (GUI) that includes information associated with placing, conducting, and terminating a phone call. As another example, if the mobile terminal 100 is in a video call mode or a photographing mode, the display 151 may additionally or alternatively display images that are associated with these modes, the UI or the GUI.

The display 151 may be implemented using known display technologies including, a liquid crystal display (LCD), a thin film transistor-liquid crystal display (TFT-LCD), an organic light-emitting diode display (OLED), a flexible display and a three-dimensional display, for example. The mobile terminal 100 may include one or more of such displays.

Some of the above displays can be implemented in a transparent or optical transmittive type, which can be called a transparent display. As a representative example for the transparent display, there is TOLED (transparent OLED) or the like. A rear configuration of the display 151 can be implemented in the optical transmittive type as well. In this configuration, a user may see an object in rear of a terminal body via the area occupied by the display 151 of the terminal body.

At least two displays 151 can be provided to the mobile terminal 100 in accordance with the implemented configuration of the mobile terminal 100. For example, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereafter called 'touch sensor') configures a mutual layer structure (hereafter called 'touchscreen'), it is able to use the display 151 as an input device as well as an output device. In this example, the touch sensor can be configured as a touch film, a touch sheet, a touchpad and/or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller may process the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor may be a sensor that detects a presence or non-presence of an object approaching a prescribed detecting surface or an object existing around the proximity sensor using an electromagnetic field strength or infrared ray without mechanical contact. The proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. In an example that the touchscreen includes the electrostatic capacity proximity sensor, it is configured to detect proximity of a pointer using a variation of an electric field according to the proximity of the pointer. In this example, the touchscreen (touch sensor) can be classified as the proximity sensor.

The proximity sensor may detect a proximity touch and a proximity touch pattern (e.g., a proximity touch distance, a proximity touch duration, a proximity touch position, a proximity touch shift state, etc.). Information corresponding to the detected proximity touch action and the detected proximity touch pattern can be outputted to the touchscreen.

The audio output module 152 may function in various modes including a call-receiving mode, a call-placing mode, a recording mode, a voice recognition mode, a broadcast reception mode and/or the like to output audio data that is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 (or alarm) is output a signal for announcing the occurrence of a particular event associated with the mobile terminal 100. The events may include a call received event, a message received event and a touch input received event. The alarm unit 153 may be able to output a signal for announcing the event occurrence by way of vibration as well as video or audio signal. The video or audio signal can be outputted via the display 151 or the audio output unit 152. The display 151 or the audio output module 152 can be regarded as a part of the alarm unit 153.

The haptic module 154 may generate various tactile effects that can be sensed by a user. Vibration is a representative one of the tactile effects generated by the haptic module 154. Strength and pattern of the vibration generated by the haptic module 154 are controllable. For example, different vibrations can be outputted in a manner of being synthesized together or can be outputted in sequence.

The haptic module 154 may generate various tactile effects as well as the vibration. For example, the haptic module 154 may generate the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of a finger, an arm or the like as well as to transfer the tactile effect through a direct contact. At least two haptic modules 154 can be provided to the mobile terminal 100 in accordance with the corresponding configuration type of the mobile terminal 100.

The projector module 155 may perform an image projector function using the mobile terminal 100. The projector module 155 may display an image, which is identical to or partially different at least from the image displayed on the display 151, on an external screen or wall according to a control signal of the controller 180.

The projector module 155 can include a light source generating light (e.g., laser) for projecting an image externally, an image producing means for producing an image to output externally using the light generated from the light source, and a lens for enlarging to output the image externally in a predetermined focus distance. The projector module 155 can further include a device for adjusting an image projected direction by mechanically moving the lens or the whole module.

The projector module 155 can be classified as a CRT (cathode ray tube) module, an LCD (liquid crystal display) module, a DLP (digital light processing) module and/or the like according to a device type of a display means. The DLP module may be operated by the mechanism of enabling the light generated from the light source to reflect on a DMD (digital micro-mirror device) chip and can be advantageous for the downsizing of the projector module 151.

The projector module 155 can be provided in a length direction of a lateral, front or backside direction of the mobile terminal 100. The projector module 155 can be provided to any portion of the mobile terminal 100 according to the necessity thereof.

The memory 160 (or memory unit) may be used to store various types of data to support processing, control, and storage requirements of the mobile terminal 100. Examples of such data include program instructions for applications operating on the mobile terminal 100, contact data, phonebook data, messages, audio, still pictures (or photo), moving pictures, etc. A recent use history or a cumulative use frequency of each data (e.g., use frequency for each phonebook, each message or each multimedia) may be stored in the memory 160. Moreover, data for various patterns of vibration and/or sound outputted in case of a touch input to the touchscreen can be stored in the memory 160 (or memory unit).

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. The mobile terminal 100 is able to operate in association with a web storage for performing a storage function of the memory 160 on Internet.

The interface unit 170 is often implemented to couple the mobile terminal 100 with external devices. The interface unit 170 may receive data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and may include User Identify Module (UIM), Subscriber Identify Module (SIM), Universal Subscriber Identity Module (USIM) and/or the like. A device having the identity module (hereafter called an identity device) can be manufactured as a smart card. Therefore, the identity device is connectable to the mobile terminal 100 via the corresponding port.

When the mobile terminal is connected to an external cradle, the interface unit 170 may become a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 may control overall operations of the mobile terminal 100. For example, the controller 180 may perform the control and processing associated with voice calls, data communications, video calls, etc. The controller 180 may include a multimedia module 181 that provides multimedia playback. The multimedia module 181 may be configured as part of the controller 180, or may be implemented as a separate component.

The controller 180 may be able to perform a pattern (or image) recognizing process for recognizing a writing input and a picture drawing input carried, out on the touchscreen as characters or images, respectively.

The power supply 190 (or power supply unit) may provide power required by the various components for the mobile terminal 100. The power may be internal power, external power, and/or combinations thereof.

Various embodiments described herein may be implemented in a computer-readable medium using, for example, computer software, hardware, or some combination thereof. For a hardware implementation, embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a selective combination thereof. Such embodiments may also be implemented by the controller 180.

For a software implementation, embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
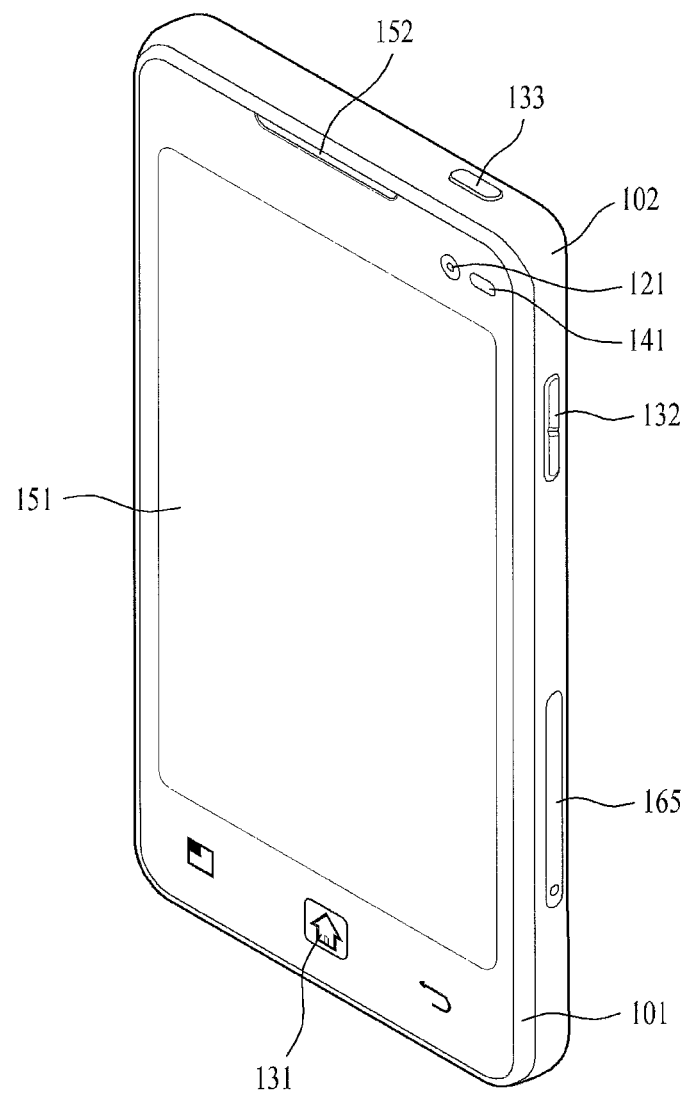
FIG. 2 is a front perspective diagram for one example of a mobile or portable terminal.

FIG. 2 is a front perspective diagram of a mobile terminal according to one example embodiment. Other embodiments and configurations may also be provided.

The mobile terminal 100 may have a bar type terminal body. The mobile terminal 100 may be implemented in a variety of different configurations. Examples of such configurations include folder-type, slide-type, rotational-type, swing-type and/or combinations thereof. For clarity, further disclosure may primarily relate to a bar-type mobile terminal 100. However, such teachings may apply equally to other types of mobile terminals.

Referring to FIG. 2, the mobile terminal 100 may include a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. At least one middle case can be further provided between the front and rear cases 101 and 102.

The cases 101 and 102 are formed by injection molding of synthetic resin or can be formed of metal substance such as stainless steel (STS), titanium (Ti) and/or the like, for example.

A display 151, an audio output unit 152, a camera 121, user input units 130/131 and 132, a microphone 122, an interface and/or the like can be provided to the terminal body, and more particularly to the front case 101.

The display 151 may occupy most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 may be manipulated to receive a command for controlling an operation of the mobile terminal 100. The input unit 130 is able to include a plurality of manipulating units 131 and 132. The manipulating units 131 and 132 can be called a manipulating portion and may adopt any mechanism of a tactile manner that enables a user to perform a manipulation action by experiencing a tactile feeling.

Content inputted by the first or second manipulating unit 131 or 132 can be diversely set. For example, such a command as start, end, scroll and/or the like may be inputted to the first manipulating unit 131. A command for a volume adjustment of sound outputted from the audio output unit 152, a command for a switching to a touch recognizing mode of the display 151 and/or the like can be inputted to the second manipulating unit 132.

Figure 3:
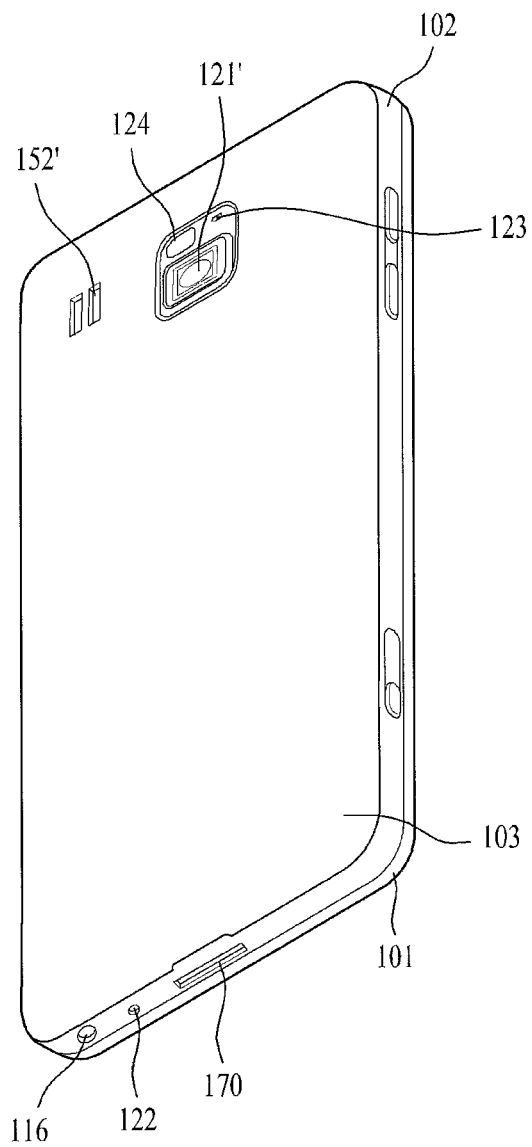
FIG. 3 is a rear perspective diagram of the mobile terminal shown in FIG. 2.

FIG. 3 is a perspective diagram of a backside of the mobile terminal shown in FIG. 2.

Referring to FIG. 3, a camera 121' may be additionally provided to a backside of the terminal body, and more particularly to the rear case 102. The camera 121 may have a photographing direction that is substantially opposite to that of the former camera 121 shown in FIG. 21A and may have pixels differing from those of the former camera 121.

Preferably, the former camera 121 may have low pixels enough to capture and transmit a picture of user's face for a video call, while the latter camera 121' may have high pixels for capturing a general subject for photography without transmitting the captured subject. Each of the cameras 121 and 121' can be installed at the terminal body to be rotated or popped up.

A flash 123 and a mirror 124 may be additionally provided adjacent to the camera 121'. The flash 123 may project light toward a subject in case of photographing the subject using the camera 121'. In case that a user attempts to take a picture of the user (self-photography) using the camera 121', the mirror 124 may enable the user to view a user's face reflected by the mirror 124.

An additional audio output unit 152' can be provided to the backside of the terminal body. The additional audio output unit 152' may implement a stereo function together with the former audio output unit 152 (shown in FIG. 2) and may be used for implementation of a speakerphone mode in talking over the terminal.

A broadcast signal receiving antenna 116 may be additionally provided to the lateral side of the terminal body as well as an antenna for communication and/or the like. The antenna 116 constructing a portion of the broadcast receiving module 111 (shown in FIG. 1) can be retractably provided to the terminal body.

Figure 4:
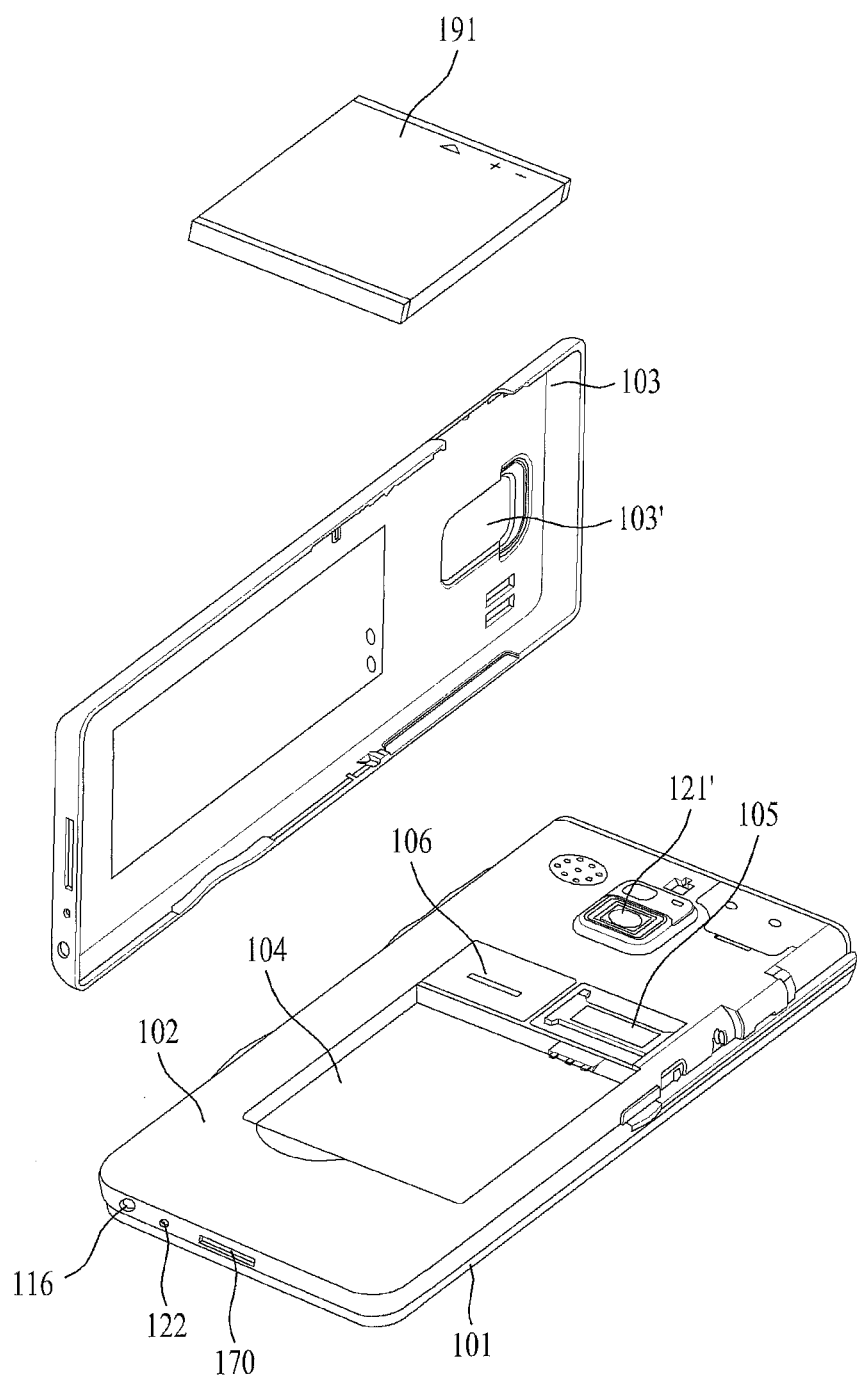
FIG. 4 is a rear perspective diagram of a surface of a rear case exposed by separating a rear cover of a mobile terminal according to one example embodiment.

FIG. 4 is a rear perspective diagram of a surface of a rear case exposed by separating a rear cover of a mobile terminal according to one example embodiment. Other embodiments and configurations may also be provided.

Referring to FIG. 4, the front case 101, the rear case 102, a rear cover (or a battery cover) 103, a camera 121', the interface 170 (or interface unit), the microphone 122, a speaker module, an audio output unit 152', a battery 191, a battery loading unit 104, a USIM card loading unit 166, and a memory card loading unit 167 are provided.

A space for mounting an external part (such as the battery loading unit 104, the USIM card loading unit 105, the memory card loading unit 106 and the like) can be provided to a surface of the rear case 102. The external part loaded on the surface of the rear case 102 is provided to extend functions of the mobile terminal 100 in order to meet diversified functions of the mobile terminal and a variety of the consumer's needs.

As performance of the mobile terminal gets diverse, the battery 191 can be configured as a replaceable type, as shown in FIG. 4, to complement a considerable amount of power consumption. In case that the replaceable type is adopted, the battery loading unit 104 is formed on the surface of the rear case 102 to enable a user to detach the corresponding battery. In this example, a contact terminal is provided to the battery loading unit 104 to be electrically connected to a part installed within the case.

The USIM card loading unit 166 or the memory card loading unit 167 may be provided, as shown in FIG. 4, next to the battery loading unit 104. Alternatively, the USIM card loading unit 166 or the memory card loading unit 167 may be provided to a bottom surface of the battery loading unit 104. The battery 191 can be externally exposed if the battery 191 is unloaded from the battery loading unit 104. In this example, since a size of the battery loading unit 104 is extensible, the battery 191 can be oversized.

Although FIG. 4 shows the configuration that the USIM card loading unit 166 or the memory card loading unit 167 is mounted on a backside of the rear case 102, it can be inserted in or separated from the mobile terminal 100 in a manner of being inserted in a lateral side of the rear case 102.

The rear cover 103 may cover the surface of the rear case 102. The rear cover 103 can fix the battery 191, the USIM card, the memory card and the lime not to be separated from the rear case 102 and may also protect the external parts from external shocks or particles. A waterproof function may be provided to the mobile terminal 100. In order to prevent external parts from contacting with water, the mobile terminal 100 can further include a waterproof structure. When the rear case 102 and the rear cover 103 are connected to each other, the waterproof structure can seal up a gap between the rear case 102 and the rear cover 103.

The mobile terminal market may attempt to develop mobile terminals of various types to meet diversity of consumer's needs. The types of the developed mobile terminals are focused on a configuration that can emphasize portability of the mobile terminal. The mobile terminal types for high portability can include types that are wearable on a user's body, such as a watch type, a glasses type, a necklace type and for the like. The mobile terminals of those types exist in case of having difficulty in applying used input/output means in the same manner. For example, since the mobile terminals have a display size relatively smaller than that of a mobile terminal of an existing type, it may be necessary to consider a different kind of an output means. More particularly, in case of a mobile terminal of a necklace type, an input/output means of a totally new type may be required due to a limited size of the mobile terminal. Embodiments may provide a method of controlling the mobile terminal of the necklace type.

Figure 5A:
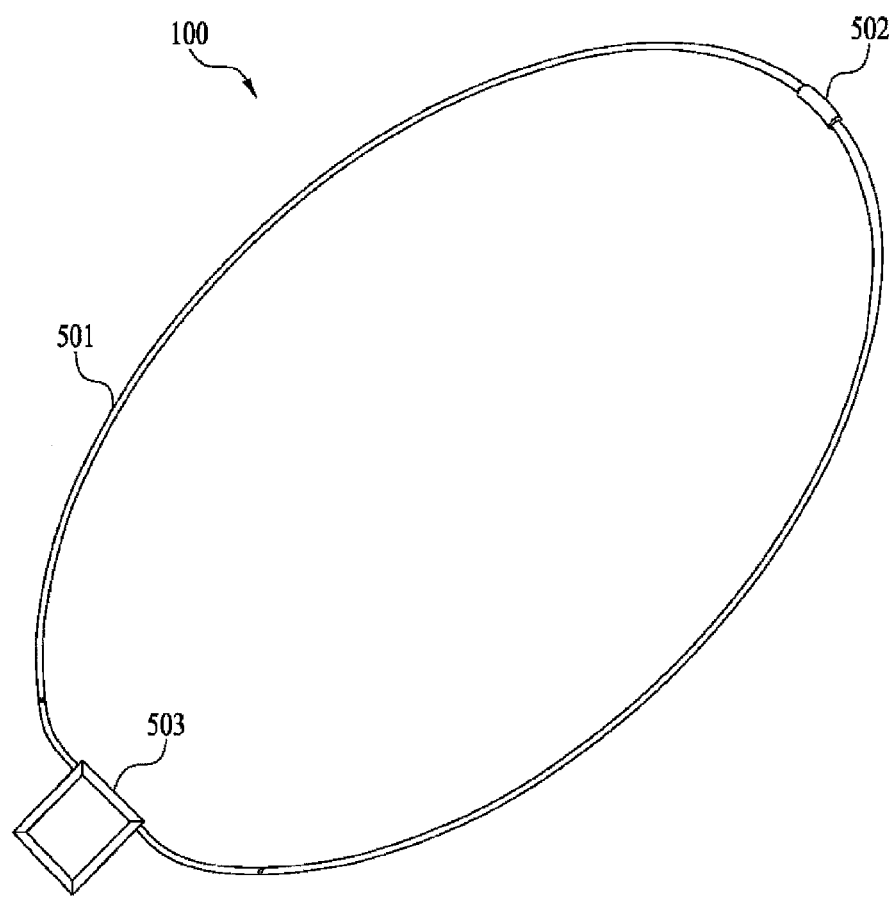
FIG. 5a is a diagram for one example of a mobile terminal of a necklace type according to one example embodiment.

FIG. 5a is a diagram for one example of a mobile terminal of a necklace type according to an example embodiment. Other embodiments and configurations may also be provided.

Referring to FIG. 5a, the configuration shown with reference to FIG. 1 can include a pendant part 503 of a necklace, entirely or in part. The mobile terminal 100 can include a necklace strap 501 to be worn on a user's neck and may further include a locking part 502 to lock both ends of the necklace strap 501 together. When the locking part 502 is unlocked, if the necklace strap 501 is worn on a user's neck and both ends of the necklace strap 501 are then locked together using the locking part 502, the user can wear the mobile terminal 100 of the necklace type (shown in FIG. 5a).

According to one embodiment, the mobile terminal 100 (of the necklace type) may be controlled through a user's voice command to overcome a limitation of a size of the mobile terminal 100.

Figure 5B:
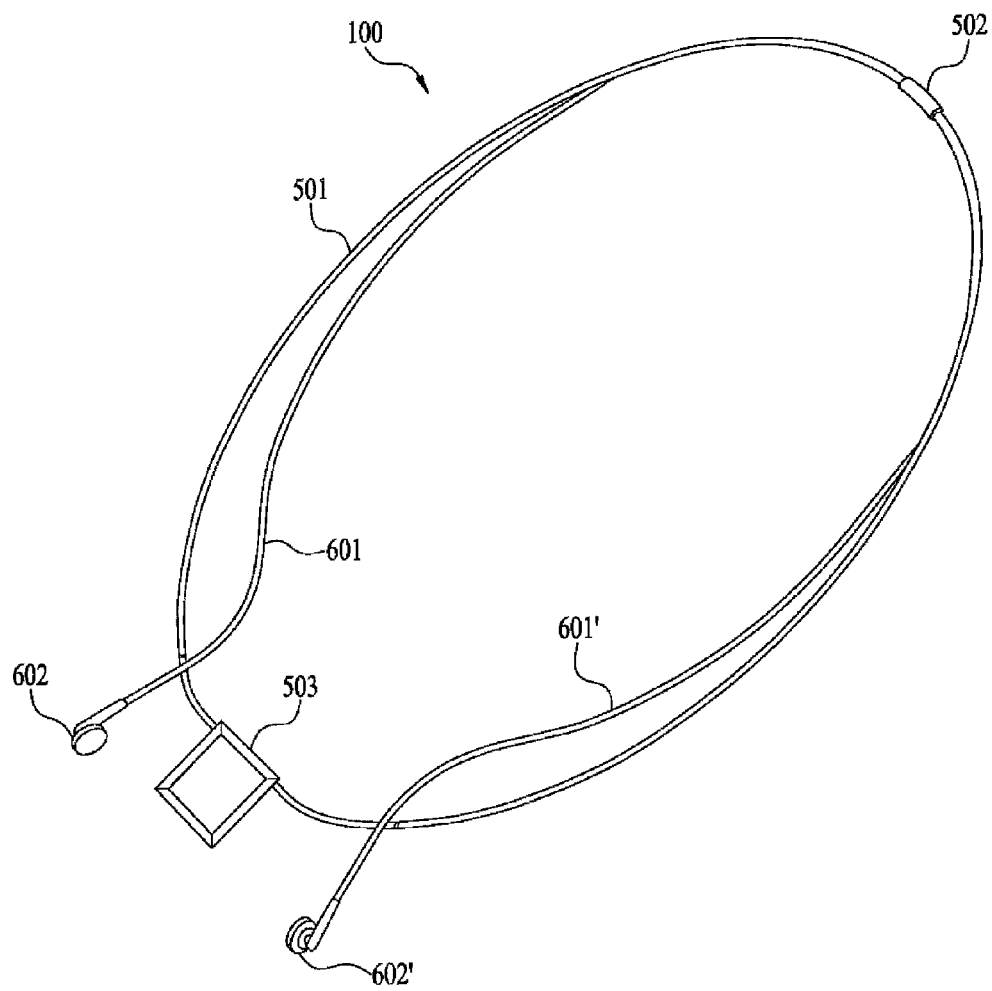
FIG. 5b is a diagram for an example of a mobile terminal of a necklace type according to one example embodiment.

FIG. 5b is a diagram for another example of a mobile terminal of a necklace type according to an example embodiment. Other embodiments and configurations may also be provided.

FIG. 5b shows a pair of earphones 602 and 602' in addition to structure of the mobile terminal 100 (of the necklace type described with respect to FIG. 5a). A pair of the earphones 602 and 602' can be electrically connected to the mobile terminal 100 through the necklace strap 501. The necklace strap 501 may be used in receiving an audio signal through the mobile terminal 100.

FIG. 6 is a diagram for one example of front and rear sides of a mobile terminal of a necklace type according to an example embodiment. Other embodiments and configurations may also be provided.

Referring to FIG. 6, a pendant part 503 can be divided into a front side (shown in FIG. 6 (a)) and a rear side (shown in FIG. 6 (b)). The front side can include a photo fixing frame for a user to carry a photo 603 provided in the photo fixing frame like a pendant of a necklace. Alternatively, the front side of the pendant part 503 may include the display 151 so that the mobile terminal 100 (of the necklace type) can operate such that an image set up by a user is displayed on the front side of the pendant part 503.

The sensing unit 140 (of the mobile terminal 100) can include a plurality of location detecting sensors configured to detect a location of the pendant part 503. More particularly, a plurality of the location detecting sensors 604a, 604b . . . configured to detect a location attributed to a slide movement of the pendant part 503 can be provided along the necklace strap 501 connected to the pendant part 503. More particularly, a plurality of the location detecting sensors 604a, 604b . . . can be arranged along the necklace strap 501 by being spaced apart from each other by a prescribed distance.

For example, in case that the pendant part 503 is located at the location detecting sensor 604b of the necklace strap 501, the controller 180 can determine a location of the pendant part 503 based on a signal detected from the location detecting sensor 604b.

The microphone 122 may be provided at a prescribed region 605 of the rear side of the pendant part 503. Since the mobile terminal 100 recognizes a user's voice command and then performs a prescribed function based on the recognized voice command, the microphone 122 can be provided at the pendant part 503. FIG. 6 shows a plurality of the location detecting sensors 604a, 604b . . . and the location 605 of the microphone 122, although other embodiments may also be provided. More particularly, in order to recognize a user's voice command, the microphone 122 can be more clearly located at a prescribed point on the necklace strap 501.

Figure 7:
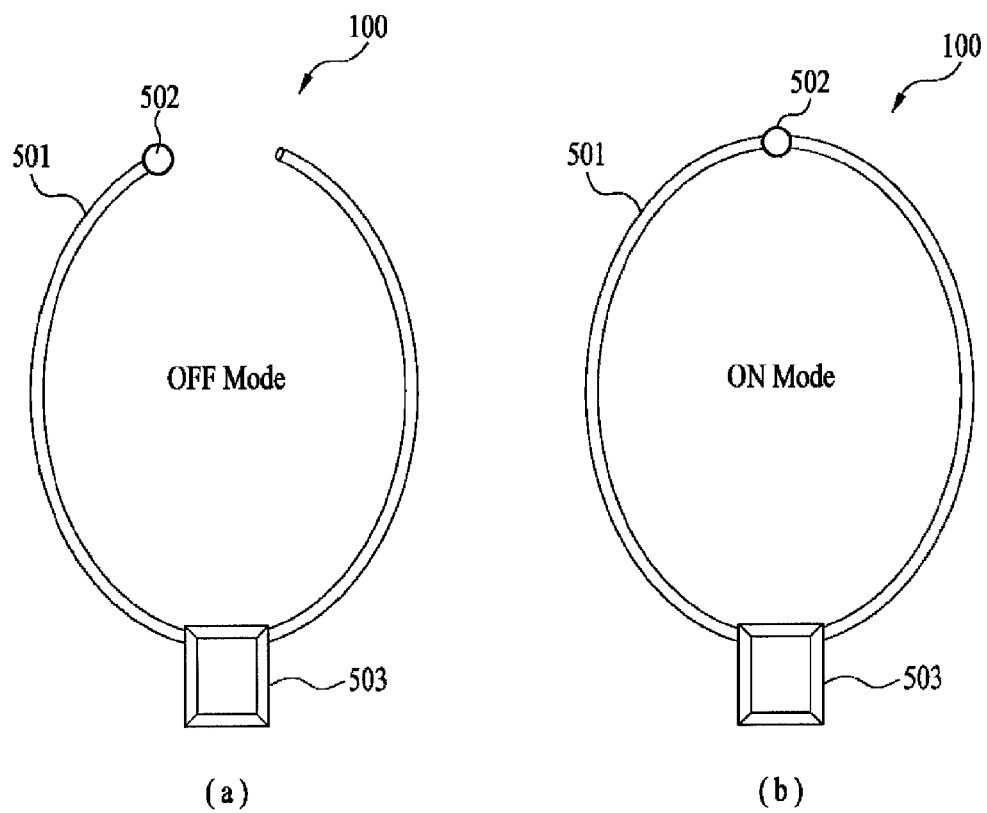
FIG. 7 is a diagram for unlocked and locked states of a locking part according to one example embodiment.

FIG. 7 is a diagram for unlocked and locked states of a locking part 502 according to an example embodiment. Other embodiments and configurations may also be provided.

The controller 180 can detect a locked state or an unlocked state through the locking part 502.

Due to the property of the mobile terminal 100 (of the necklace type) worn on a user's neck, the mobile terminal 100 inevitably may have a limited size and a limited storable maximum energy due to the limited size. A control of power consumption may be essential to the mobile terminal 100. According to example embodiment, a power consumption may be controlled based on locking/unlocking detected through the locking part 502.

Referring to FIG. 7 (*a*), if the locking part 502 is detected to be unlocked, the controller 180 can control at least one function (or module) to be deactivated or disabled. More particularly, the microphone 122 may be deactivated to control power consumption of the microphone 122. The reason for this is that the controller 180 may waste a considerable amount of power consumed in continuously analyzing audio signals received through the microphone 122 to identify a received voice in addition to power consumption of a module of the microphone 122. Therefore, waste of power consumption may be minimized through deactivation of the audio analyzing operation as well as to deactivate the microphone 122.

Referring to FIG. 7 (*b*), if the locking part 502 is determined to be locked, the controller 180 can deactivate at least one function (or module) to be activated (or enabled) again. As the activated function or module is identical to the former function or module described through the deactivation, its details may be omitted from the following description.

The activation/deactivation function can further include a connection to another mobile terminal. Such an embodiment is described in detail with reference to FIG. 8.

Figure 8:
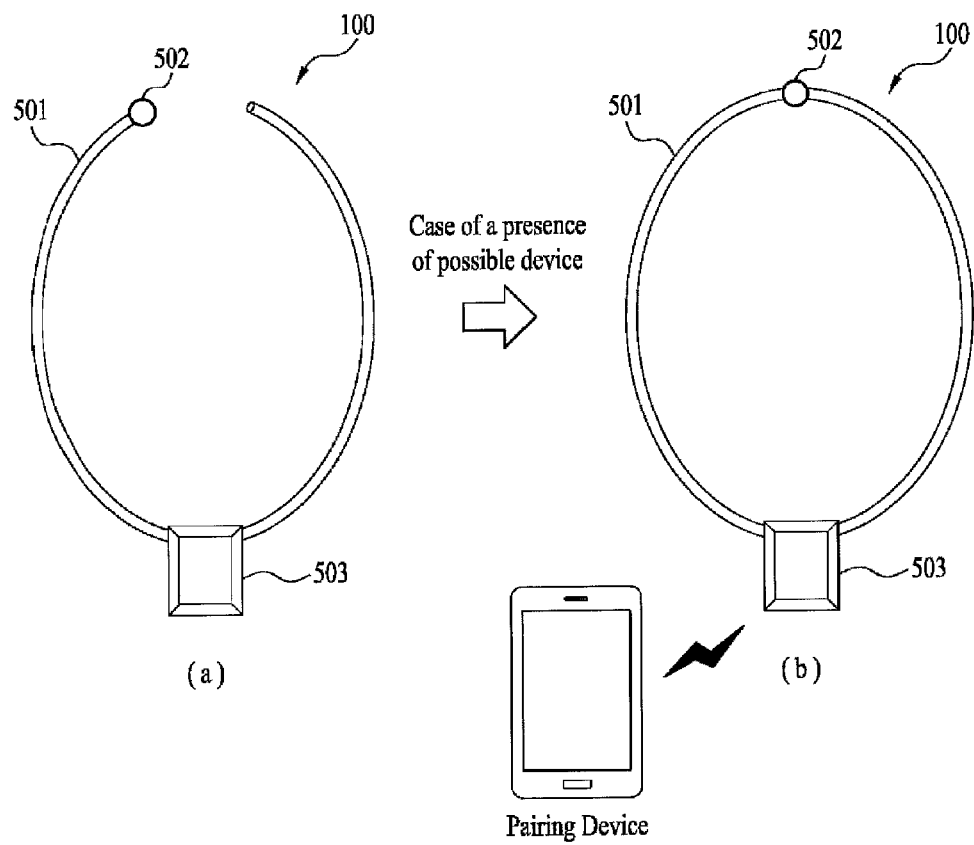
FIG. 8 is a diagram for a method of controlling a connection with another mobile terminal in accordance with an unlocked or locked state of a locking unit according to one example embodiment.

FIG. 8 is a diagram for a method of controlling a connection with another mobile terminal in accordance with an unlocked or locked state of a locking unit 502 according to an example embodiment. Other embodiments and configurations may also be provided.

FIG. 8 (*a*) shows a state in which the locking part 502 is unlocked. FIG. 8 (*b*) shows a state in which the locking part 502 is locked. If the controller 180 detects the locking through the locking part 502, the controller 180 can attempt a connection to at least one different mobile terminal. In this example, the connection attempted to at least one different mobile terminal can include a mobile terminal having a previously connected history. Alternatively, the connection attempted to at least one different mobile terminal can include a currently connectable mobile terminal.

More particularly, when the mobile terminal 100 is in an unlocked state through the locking part 502, the mobile terminal 100 can minimize a wasted power consumption by maintaining a state that a connection to a different mobile terminal is disabled. Further, when a locking through the locking part 502 is detected, the mobile terminal 100 may automatically perform a connection to a different mobile terminal so as to be advantageous in quickly providing a user with a function.

With reference to FIG. 7 and FIG. 8, the method of controlling activation/deactivation of a prescribed function based on a result detected through the locking part 502 is described. In the following description, a method of accurately recognizing a voice command may be explained with reference to the accompanying drawings.

First of all, according to a method of recognizing a user's voice command and then utilizing a result of the recognition as an input means, if the user's voice command is longer, then it is highly probable that a recognition rate may become considerably lower. Moreover, since such a voice command may reveal a user's intention to others, it may be necessary to be improved. According to an example embodiment, a new method may be provided for a user input means configured to input a user's voice command more accurately without revealing a user's intention. More particularly, with reference to FIGS. 9a to 9e, the mobile terminal 100 may detect a location of the pendant part 503 (on the necklace strap 501) and differentiate an executed function depending on the location of the pendant part 503.

FIGS. 9a to 9e are diagrams for a mechanical structure of a pendant part 503 and a necklace strap 501 and a relative location in a mobile terminal 100 (of a necklace type) having the pendant part 503 according to an example embodiment. The sensing unit 140 may further detect a location of the pendant part 503.

The location of the pendant part 503 detected by the sensing unit 140 may mean a relative location on the necklace strap 501. More particularly, the pendant part 503 can move (slide move) while locked to the necklace strap 501. The sensing unit 140 can detect the relative location, which varies in response to the sliding movement on the necklace strap 501, through a plurality of the location detecting sensors 604a, 604b . . . described above with reference to FIG. 6. In the following description, the location of the pendant part 503 may indicate a location relative to the necklace strap 501. The location of the pendant part 503 may be expressed as 1-dimensional location (e.g., a point corresponding to 3 mm from a basic location in (+) direction, a point corresponding to 1 mm from a basic location in (−) direction, etc.) due to movement on the necklace strap 501.

The location of the pendant part 503 may be detected through a plurality of the location detecting sensors arranged along the necklace strap 501, by which the location is non-limited. The mobile terminal controlling method can detect the location of the pendant part 503 by receiving the detected signals from the gyroscope sensor, the acceleration sensor and/or the geomagnetic sensor.

Referring to FIG. 9a, a location of the pendant part 503 is shown. If a user wears the necklace type mobile terminal 100, similar to the example shown in FIG. 9a (*a*), the pendant part 503 may naturally face downward. The location of the pendant part 503 shown in FIG. 9a (*a*) may be called a basic location.

If a user moves a location of the pendant part 503 in a right direction (as shown in FIG. 9a (a)), the pendant part 503 can slide to move to 'location A' shown in FIG. 9a (b). If a user moves a location of the pendant part 503 in a left direction (as shown in FIG. 9a (a)), the pendant part 503 can slide to move to 'location B' shown in FIG. 9a (c). Although the terminology 'location A' or 'location B' is used as a location, if a location of the pendant part 503 is located within a preset predetermined range, the location of the pendant part 503 is determined as a corresponding specific location and can also be determined as 'location A'.

Figure 9B:
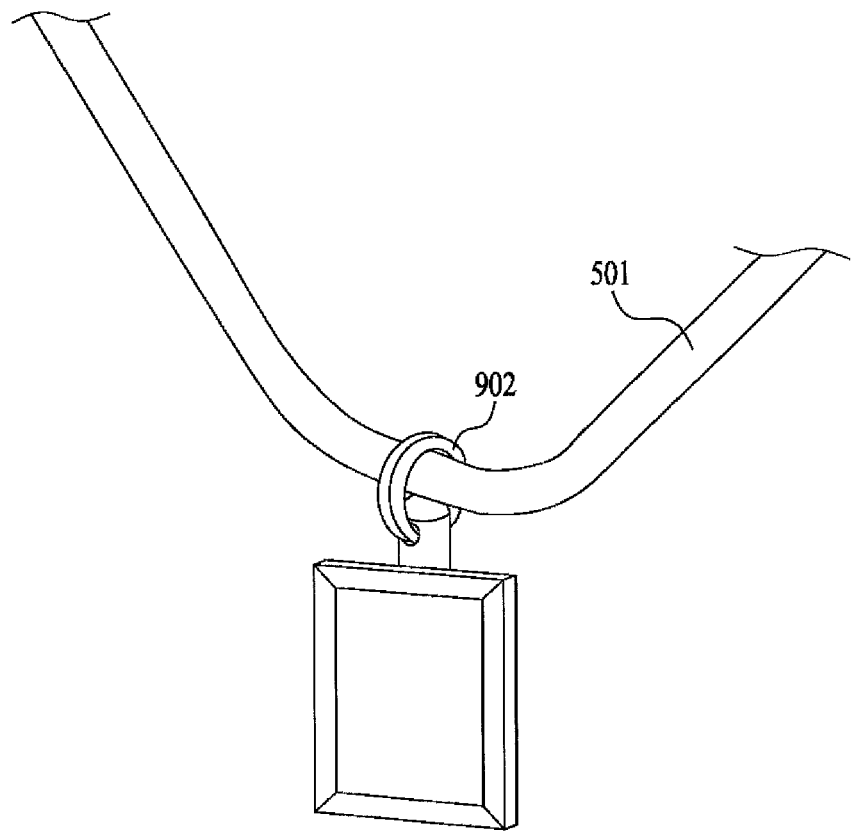

FIG. 9b is a diagram for one example of a coupled structure of a pendant part 503 and a necklace strap 501.

Referring to FIG. 9b, the pendant part 503 is coupled with a ring part 902 and the necklace strap 501 passes through a ring shape provided to the ring part 902. The pendant part 503 may slide (or move) along the necklace strap 501. The structure of the ring part 902 (shown in FIG. 9b) shows only one example, although other embodiments may also be provided.

Figure 9C:
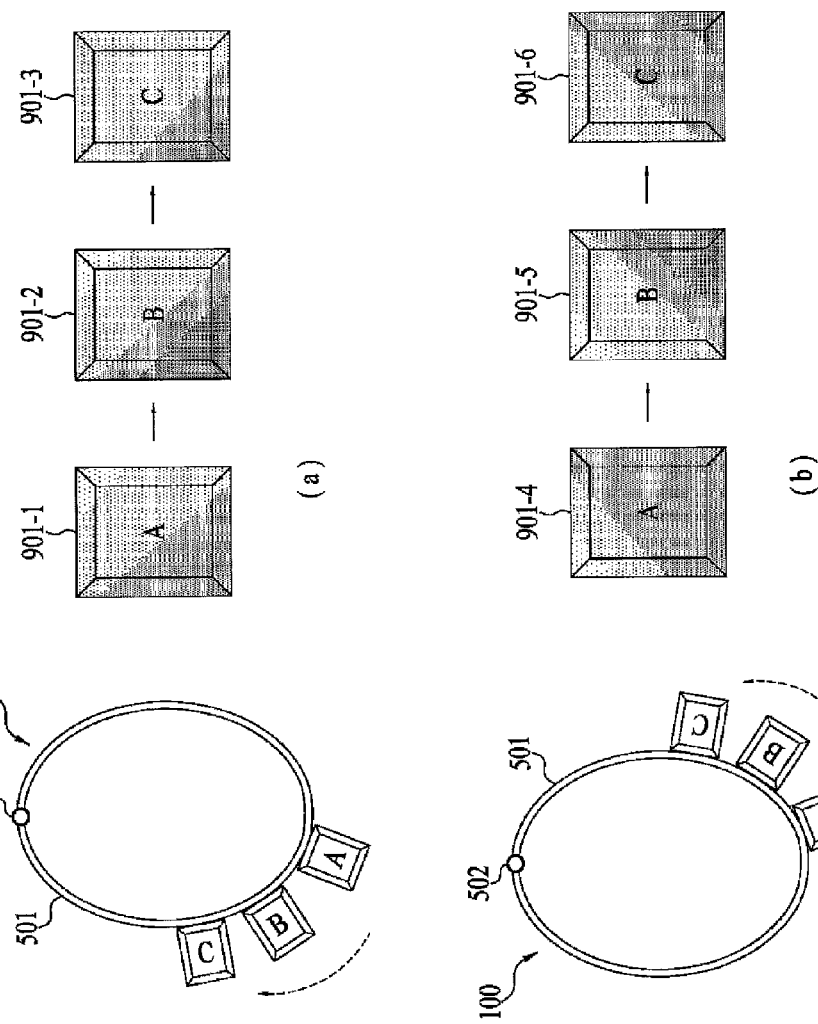

FIG. 9c is a diagram of the display unit by which light emission configuration changes depending on a location of the pendant part 503.

According to an example embodiment a function that is identified in accordance with a location of the pendant part 503 may be run (or executed). This may be described with respect to FIG. 10. Accordingly, a user may be able to input an accurate command when receiving a correspondingly identified feedback. Therefore, a light emission configuration of the display 151 may change based on a location of the pendant part 503.

FIG. 9c (a) shows that a location (A→B→C) of the pendant part 503 sequentially changes from 'basic location' to 'location A'. Referring to FIG. 9c (a), in response to the changing location of the pendant part 503 (shown in FIG. 9c (a)), the controller 180 controls a light emission pattern of the display 151 to be outputted in a manner of sequentially changing from the light emission pattern 901-1 to the light emission pattern 901-3.

The above-described operation may be identically applicable to 'location B' as well. FIG. 9c (b) shows that a location (A→B→C) of the pendant part 503 sequentially changes from 'basic location' to 'location B'. Referring to FIG. 9c (b), in response to the changing location of the pendant part 503 (shown in FIG. 9c (b)), the controller 180 controls a light emission pattern of the display 151 to be outputted in a manner of sequentially changing from the light emission pattern 901-4 to the light emission pattern 901-6.

The above-described embodiment relates to the configuration of the changing light emission pattern of the pendant part 503, although embodiments are not limited thereto. For example, embodiments are applicable to any configurations that can provide a feedback to a user. In particular, the mobile terminal 100 can control a strength of vibration of the pendant part 503 to gradually increase (or decrease) in response to the sequentially changing location of the pendant part 503.

The embodiment described with reference to FIG. 9a may be limited to the example that the location of the pendant part 503 moves along the necklace strap 501. An embodiment described with respect to FIG. 9d may relate to an example that a location of the pendant part 503 changes in a different direction.

Figure 9D:
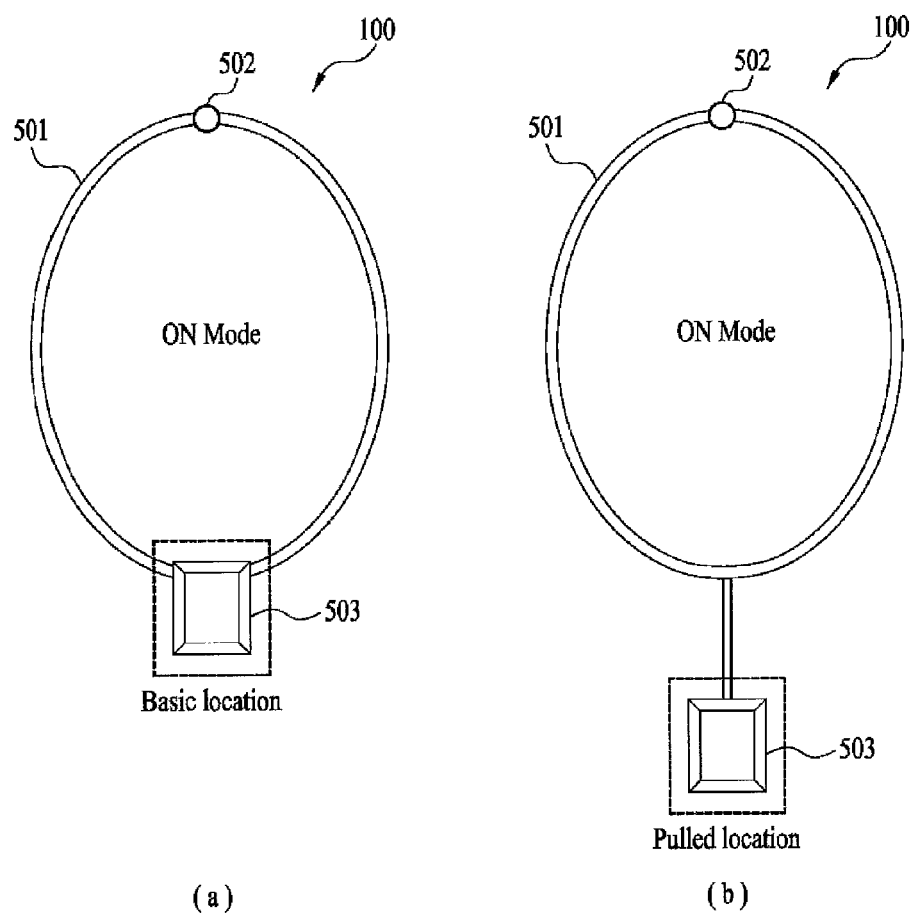

FIG. 9d (a) shows a basic location of the pendant part 503 similar to the example described with reference to FIG. 9a (a). A user may use the pendant part 503 by pulling it from the necklace strap 501. For this embodiment, a coupling structure of the pendant part 503 and the necklace strap 501 may be shown in FIG. 9e.

Figure 9E:
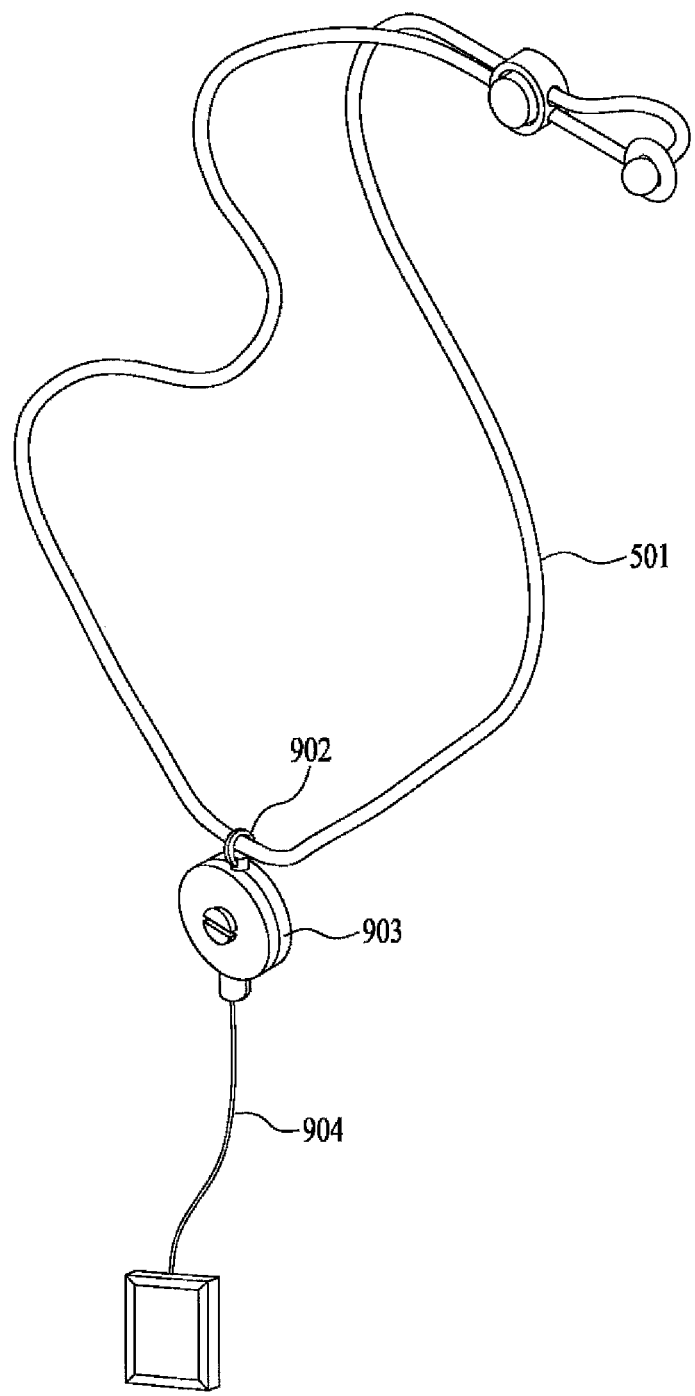

FIG. 9e is a diagram for one example of a coupled structure of the pendant part 503 and the necklace strap 501. Similar to the former coupled structure described with reference to FIG. 9b, this coupled structure can include the ring part 902. Additionally, the pendant part 503 (shown in FIG. 9e) can further include a length extension portion 903. An extension cable 904 may be provided in the length extension portion 903 coupled with the ring part 902. In particular, one end of the extension cable 904 may be coupled with the pendant part 503. The extension cable 904 may be stored inside the length extension portion 903 by being wound on a capstan. If a user pulls the pendant part 503, the extension cable 904 (in the length extension portion 903) may be pulled out to so as be elongated.

FIG. 9d (b) is a diagram of the pendant part 503 in a state that the above-described extension cable 904 is pulled out (hereafter called 'a pulled location'). According to an example embodiment, a function (classified by identifying 'basic location' or 'pulled location' shown in FIG. 9d) may be performed. In particular, the controller 180 can perform a first function corresponding to a prescribed voice command at 'basic location' or a second function corresponding to a prescribed voice command at 'pulled location'. For example, in case of 'basic location', in response to a voice command 'Record', the controller 180 can perform an operation (i.e., a first function) of recording an audio signal inputted through the microphone 122 during 1 minute. For another example, in response to a voice command 'Record', the controller 180 can perform an operation (i.e., a second function) of enabling the pendant part 503 to record an audio signal inputted through the microphone 122, while the extension cable 904 is extended, at 'pulled location' (i.e., the recording is ended when the extension cable 904 returns to an original state). The above-described first and second functions are merely exemplary. It is apparent that various functions are applicable to embodiments.

Figure 10:
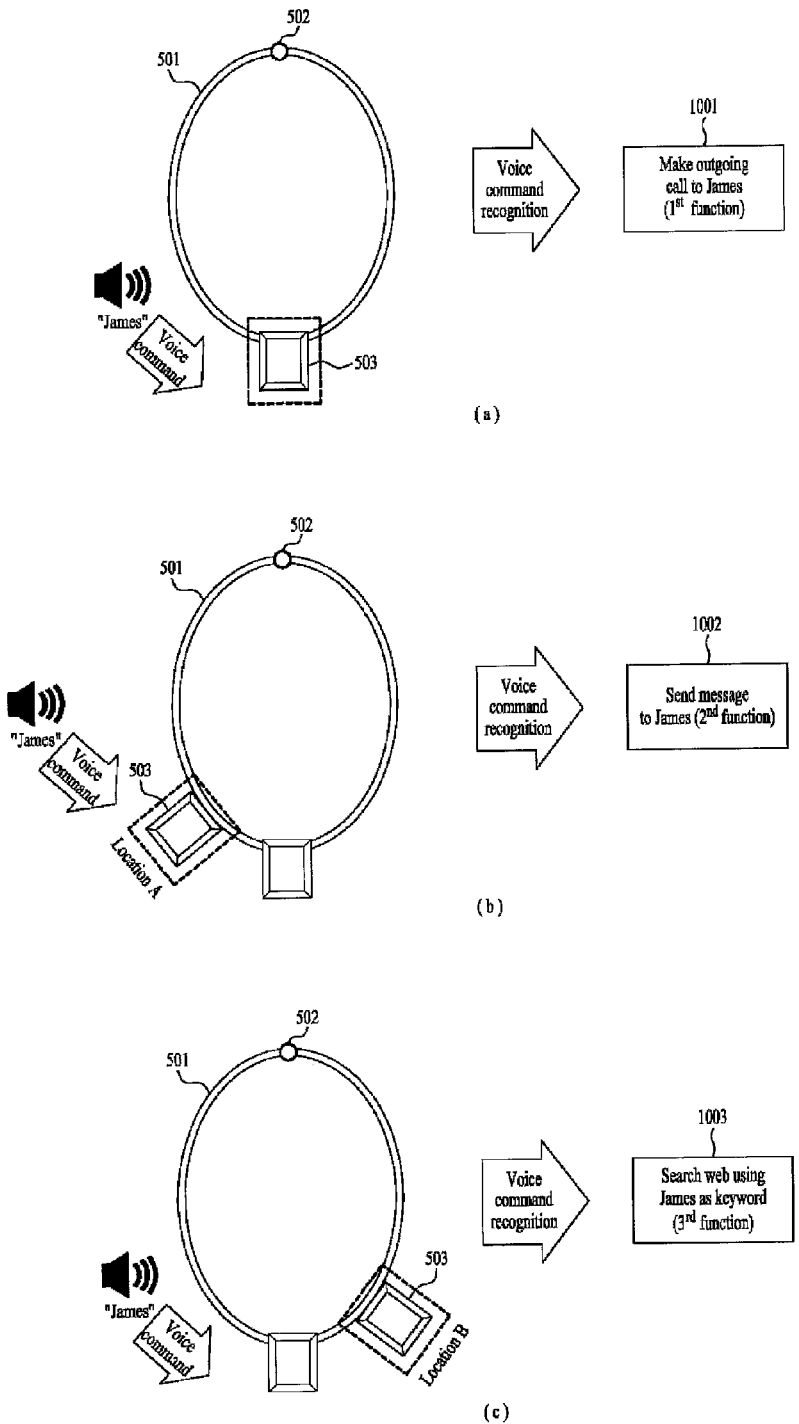
FIG. 10 is a diagram for one example of a method of performing a different function depending on a location of a pendant part in response to a recognition of a same voice command in a mobile terminal of a necklace type having the pendant part according to one example embodiment.

FIG. 10 is a diagram for one example of a method of performing a different function depending on a location of a pendant part 503 in response to a recognition of a same voice command in a mobile terminal 100 (of a necklace type) having the pendant part 503 according to an example embodiment. Other embodiments and configurations may also be provided.

Examples of a function runnable in response to each identified location shown in FIG. 9a may be explained with respect to FIG. 10.

According to an example embodiment with respect to FIG. 10, a function performed by the controller 180 in response to a same voice command may be identified depending on a location of the pendant part 503 at a timing point of receiving a voice command. In the FIG. 10 example, assume that a name 'James' of a prescribed counterpart character is inputted as the voice command.

FIG. 10 (a) shows an example of a function corresponding to the 'basic location' (shown in FIG. 9a (a)). Referring to FIG. 10 (a), in response to a voice command 'James', the controller 180 can perform a first function corresponding to the 'basic location' in a manner of making a phone call to a counterpart 'James'.

FIG. 10 (b) shows one example of a function corresponding to the 'location A' (shown in FIG. 9a (b)). Referring to FIG. 10 (b), when a location of the pendant part 503 is 'location A', if a voice command 'James' is received, the controller 180 can send a prescribed text message (e.g., a preset text message) to a counterpart 'James'.

FIG. 10 (c) shows one example of a function corresponding to the 'location B' (shown in FIG. 9a (c)). Referring to FIG. 10

(b), when a location of the pendant part 503 is 'location B', if a voice command 'James' is received, the controller 180 can perform a web search using 'James' as a keyword.

A different function may be mapped depending on a presence or a non-presence of a paired different external device. For example, while functions such as the examples described with reference to FIGS. 10 (a) to 10 (c) are mapped, assume that a different external device is paired with a necklace type mobile terminal 100-1. Fourth to sixth functions, discriminated from the above-described first to third functions may be mapped to corresponding locations, respectively. More particularly, if a command 'James', which is the same voice command, is received at the 'basic location', then the corresponding fourth function may be a function of transmitting a call signal to a counterpart 'James' through the paired external device. This function may be different than the former function of transmitting a call signal through the necklace type mobile terminal 100-1 similar to the above-described first function. Similarly, the fifth or sixth function can operate in a manner of being discriminated from the above-described functions.

A prescribed function performed in response to the same prescribed voice command is one example of a method performed in a manner of being identified depending on a location of the pendant part 503. A type of application runnable in response to an inputted voice command may be identified. Such an embodiment may be described with respect to FIG. 11.

FIG. 11 is a diagram for one example of a method of classifying a type of an application activated in response to a format of an inputted voice command according to one example embodiment. Other embodiments and configurations may also be provided.

Referring to FIG. 11 (a), a user inputs a voice command 'James' (prescribed language format) to a necklace type mobile terminal 100. In FIG. 11 (b), the user inputs a voice command 'four thirty' (time format) to the necklace type mobile terminal 100. In response to the voice command 'James', the controller 180 can control a phone application to be run. In response to the voice command 'four thirty', the controller 180 can control an alarm setting application to be run. Moreover, in response to the voice command 'James', the controller 180 may run (or execute) the alarm setting application and then control an outgoing call to be made to a call counterpart named 'James'. Similarly, in response to the voice command 'four thirty', the controller 180 may run (or execute) the alarm setting application and then control an alarm to be set for 4:30 on the corresponding application.

The running application may include an application that is run in the necklace type mobile terminal 100 or may be an application run in a different external device connected to the necklace type mobile terminal 100. In this example, the necklace type mobile terminal 100 may operate to transmit a command for running a prescribed application to the connected different external device.

Figure 12A:
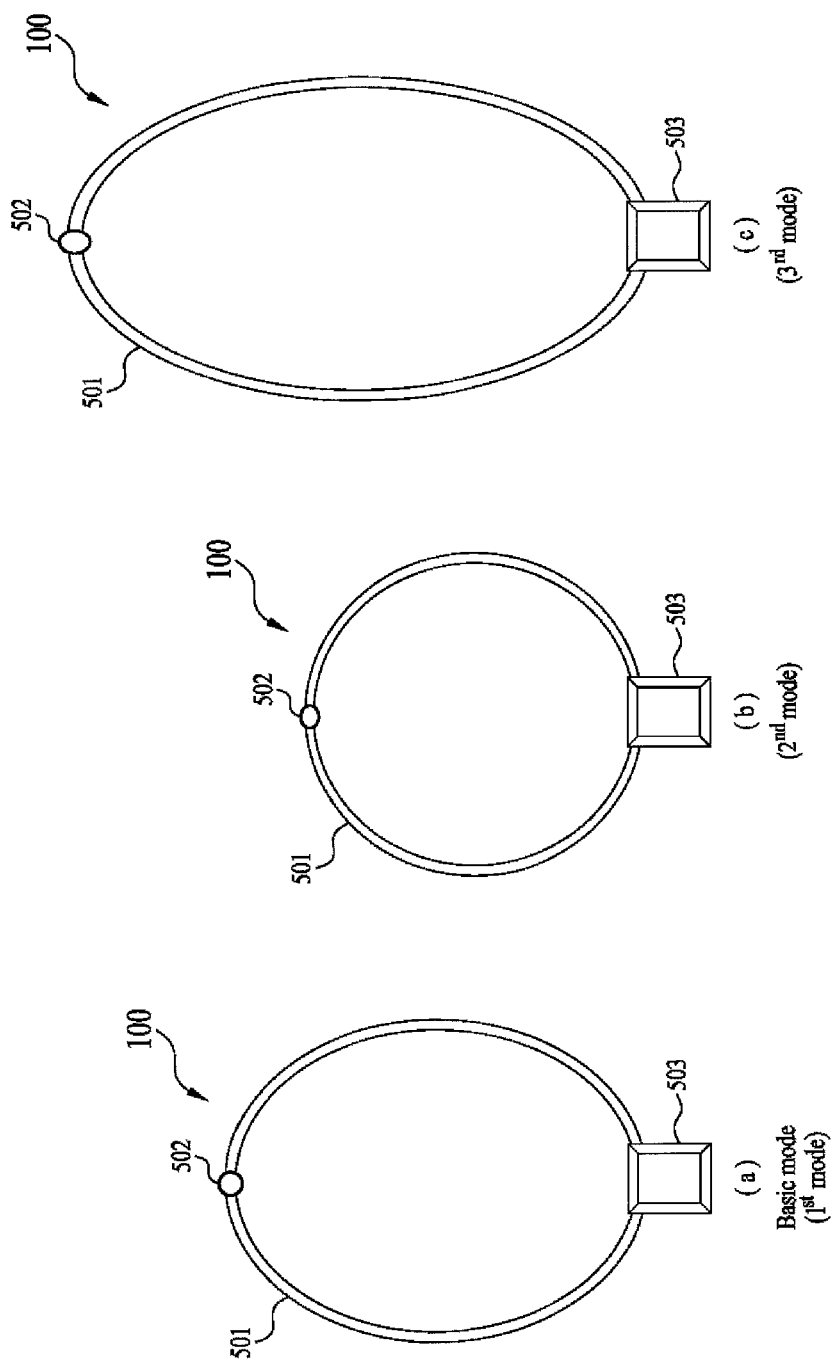

FIG. 12a and FIG. 12b are diagrams for a classification of an operating mode depending on a length adjustment of a necklace strap 501 and a structure of a length adjusting part for adjusting the necklace strap 501 according to one example embodiment. Other embodiments and configurations may also be provided.

FIG. 12a shows three kinds of modes classified in accordance with a length of the necklace strap 501. A length of a general necklace strap 501 may indicate a basic mode (or a first mode). A length shorter than that of a general necklace strap 501 may indicate a sports mode (or a second mode). A length longer than that of a general necklace strap 501 may indicate a relax mode (or a third mode). If a user gets an exercise intensively, it may be convenient for the user to decrease a length of the necklace strap 501 (of the mobile terminal 100). If a user goes to sleep, it may be convenient for the user to flexibly increase a length of the necklace strap 501 (of the mobile terminal 100). A function may be matched more efficiently in consideration of these situations.

FIG. 12b is a diagram for one example of a structure of a length adjusting part 1201 configured to adjust a length of the necklace strap 501. The pendant part 503 may be coupled with the necklace strap 501 through the ring part 902. The mobile terminal may include a length adjusting part 1201 provided to one side of the necklace strap 501. The length adjusting part 1201 may be configured to adjust a length of the necklace strap 501. The sensing unit 140 may further sense the length of the necklace strap 501 adjusted by the length adjusting part 1201. The controller 180 can control an operation in a manner of identifying one of a plurality of the modes shown in FIG. 12a.

Figure 13:
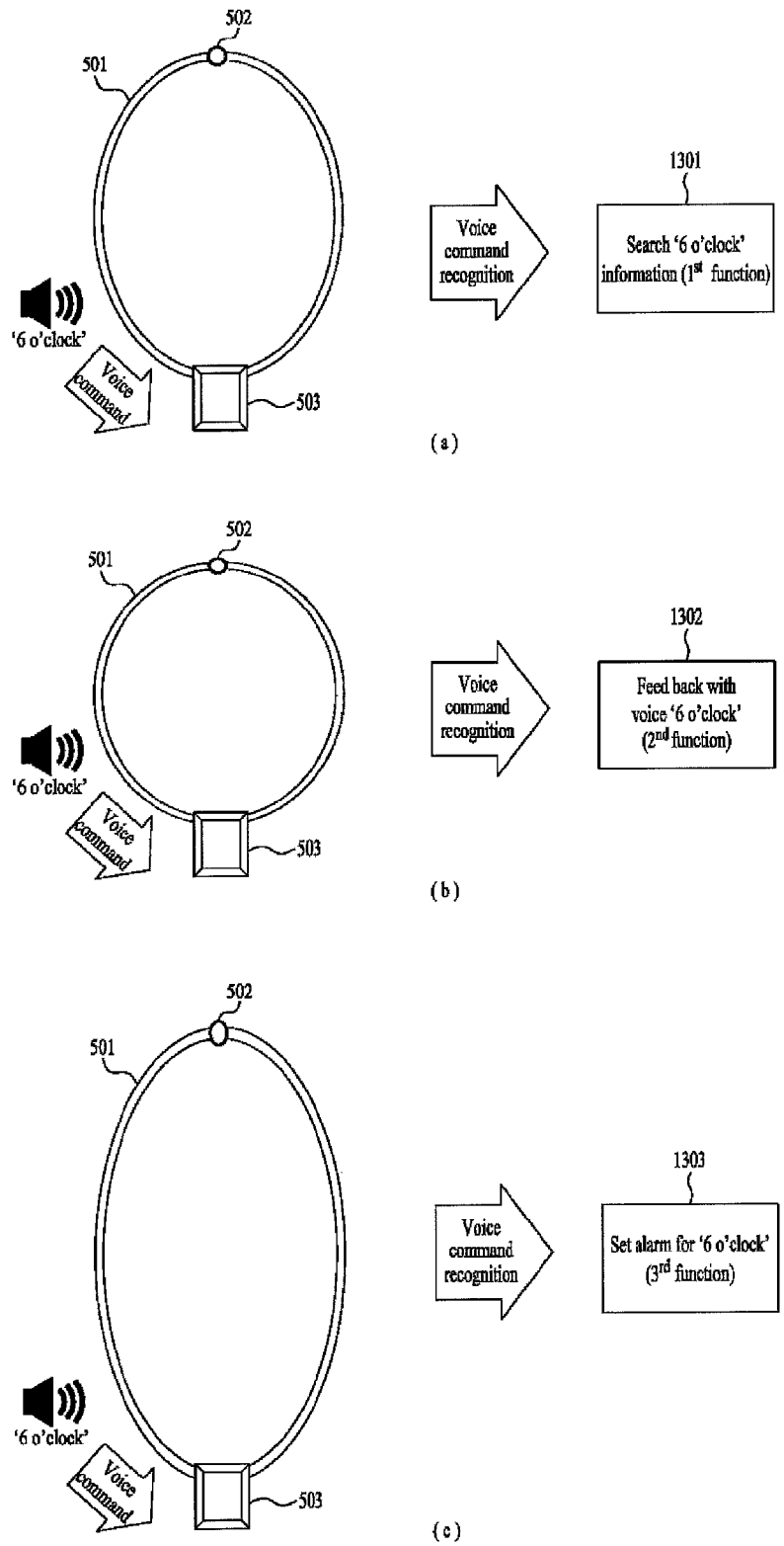
FIG. 13 is a diagram for one example of a method of performing a classified function in response to adjustment of a length of a necklace strap according to one example embodiment.

FIG. 13 is a diagram for one example of a method of performing a classified function in response to adjustment of a length of a necklace strap 501 according to one example embodiment. Other embodiments and configurations may also be provided.

One example of a function runnable to correspond to each of the locations identified in FIG. 12a may be explained.

According to the FIG. 13 embodiment, a function performed by the controller 180 in response to a same voice command is the function classified in accordance with a location of the pendant part 503 at a timing point of receiving a voice command. In the example shown in FIG. 13, a specific time '6 o'clock' is assumed as being inputted as the voice command.

FIG. 13 (a) shows one example of a function corresponding to the first mode shown in FIG. 12a (a). Referring to FIG. 13 (a), in response to the voice command '6 o'clock', the controller 180 can search for an information on the '6 o'clock' (e.g., search for a schedule saved in a schedule application at 6 o'clock corresponding to today) as a first function corresponding to the first mode. The controller 180 may provide a user with the search result information through an audio output.

FIG. 13 (b) shows one example of a function corresponding to the second mode shown in FIG. 12a (b). As discussed above, the second mode in which the necklace strap 501 is relatively short is 'sports mode'. In this mode, a user is assumed to be in a state having a relatively large activity. Therefore, according to one example embodiment, the controller 180 may match a voice command inputted in the second mode to a function used for a case of a large activity. If a voice command '6 o'clock' is received in a state that a location of the pendant part 503 is in the second mode, the controller 180 can control an information on an arrival at '6 o'clock' to be fed back to a user.

FIG. 13 (c) shows one example of a function corresponding to the third mode shown in FIG. 12a (c). The third mode, in which a length of the necklace strap 501 is longer than a general case, is a relax mode. In this mode, a user is assumed to be is in a state of a relatively small activity. When a location of the pendant part 503 is in the third mode, if a voice command '6 o'clock' is received, the controller 180 may control a schedule to be saved on '6 o'clock' using a schedule management application.

The functions included in the FIG. 13 examples are merely exemplary, although other functions may be provided. The embodiment for discriminating a function performed to correspond to each mode has been described with respect to FIG.

13. A type of an external device connected in response to each mode may be further classified. Such an embodiment is described with respect to FIGS. 14a and 14b.

Figure 14B:
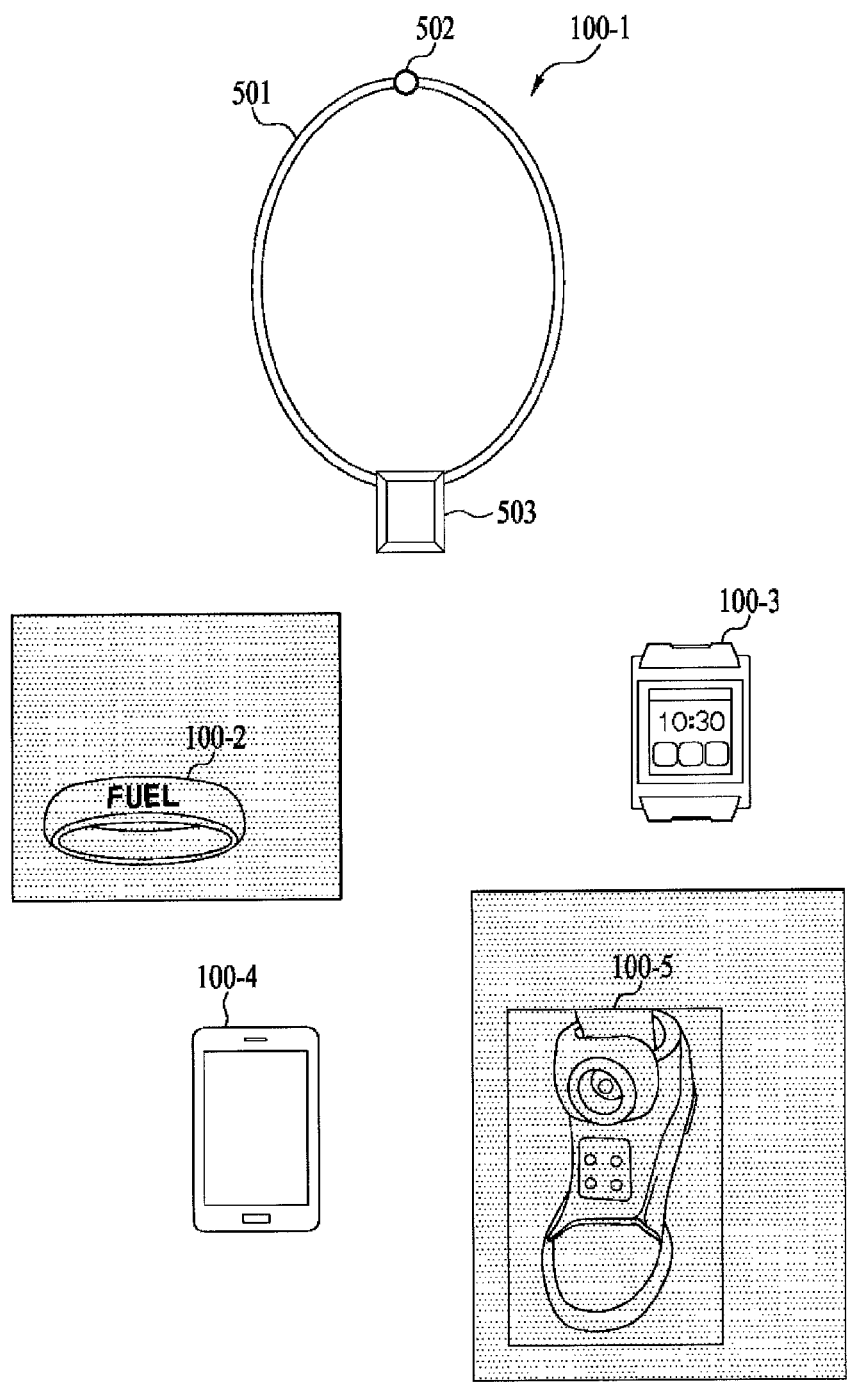

FIGS. 14a and 14b are a diagram for one example of a method of classifying a type of an external device connected in response to a classified mode according to one example embodiment. FIGS. 14a and 14b show a plurality of external devices 100-2 to 100-5 connectable to a necklace type mobile terminal 100-1 according to one example embodiment. Other embodiments and configurations may also be provided.

A connected state between a mobile terminal and an external device may be a state that data can be transceived between the mobile terminal and the external device. Such a state may be called a connection or pairing between the mobile terminal and the external device. An external device connected to a necklace type mobile terminal may be called a connected or paired external device.

FIG. 14a shows a necklace type mobile terminal 100-1 in the second mode (described with respect to FIG. 12a). FIG. 14b shows a necklace type mobile terminal 100-1 in the third mode (described with respect to FIG. 12a). An external device having a connection priority in each of the situations shown in FIGS. 14a and 14b are represented as shaded.

When a user has a large activity in the second mode described above, since it is able to assume that the user is exercising, the controller 180 can control an external device related to an exercise, which is selected from a plurality of different external devices 1002-2 to 100-5, to be preferentially connected. For example, while the first external device 100-2 of a bracelet type and the fourth external device 100-5 of a shoes type coexist, when the necklace type mobile terminal 100-1 operates in the second mode, the controller 180 of the necklace type mobile terminal 100-1 can control the first external device 100-2 of the bracelet type and the fourth external device 100-5 of the shoes type to be connected prior to other external devices. The reason for this is that a user's convenience in use can be enhanced by preferentially connecting an external device most highly possible to be used in a situation of a large activity of a user.

Priorities in examples shown in FIG. 14a may be summarized in Table 1 as follows.

TABLE 1

| Priority | External device |
| --- | --- |
| 1-1 | 100-2 |
| 1-2 | 100-5 |
| 2 | 100-3 |
| 3 | 100-4 |

If connected to one of the high-priority external devices including the first external device 100-2 of the priority 1-1 and the fourth external device 100-5 of the priority 1-2, the controller 180 can operate not to attempt a connection to external device of low priority (e.g., external device of the priority 2, external device of the priority 3, etc.). The reason for this may be as follows. First of all, assuming a situation that a high-priority external device has already been connected, a use possibility of a low-priority external device may be lowered. A considerable amount of power consumption may be estimated to maintain simultaneous connections with a number of external devices.

However, if not connected to any one of the high-priority external devices (including the first external device 100-2 of the priority 1-1 and the fourth external device 100-5 of the priority 1-2), the controller 180 may be able to attempt connections to other low-priority external devices 100-3 and 100-4.

On the other hand, since it is able to assume a situation that a user has a low activity in the third mode, the controller 180 can control the second external device 100-3 and the third external device 100-4 to be preferentially connected. The priorities may be applicable in a same manner as the above-described second mode.

As discussed above, the mobile terminal 100-1 may establish connections to a plurality of external devices and can operate to control a plurality of the connected external devices. When a user selects a specific external device from a plurality of external devices and then intends to control the specific external device, a method of selecting the specific external device may be required. Assuming that connections to a plurality of external devices are maintained, an external device may be selected, which is desired to be controlled, in accordance with a location of the pendant part 503. Such an embodiment may be described with respect to FIG. 15.

FIG. 15 is a diagram for one example of a method of specifying one of a plurality of other mobile terminals connected to a mobile terminal 100-1 according to one example embodiment. Other embodiments and configurations may also be provided.

In the examples shown in FIG. 15 (a) and FIG. 15 (b), assume that two external devices 100-2 and 100-3 are connected to a necklace type mobile terminal 100-1. A corresponding external device may be selected from a plurality of connected external devices in a manner of sliding (or moving) a pendant part 503 in a direction of the corresponding external device.

Referring to FIG. 15 (a), if a location of the pendant part 503 is slid to move to 'location A', the controller 180 can transmit a control signal 1501 to the first external device 100-2 located close to the location A. Referring to FIG. 15 (b), if a location of the pendant part 503 is slid to move to 'location B', the controller 180 can transmit a control signal 1502 to the second external device 100-3 located close to the location B.

In order to determine an external device located closely, one embodiment can further consider a strength of a transceived signal. More particularly, if the location of the pendant part 503 is moved to the location A, a strength of a transceived signal between the mobile terminal 100-1 and the first external device 100-2 may become greater than that of a transceived signal between the mobile terminal 100-1 and the second external device 100-3. The controller 180 can transmit the control signal 1501 by specifying the first external device 100-2 located closer to the mobile terminal 10-1.

The controller 180 can control a control signal to be transmitted to an external device matched to each location of the pendant part 503 irrespective of proximity of distance. More particularly, if the pendant part 503 is moved to the location A, the controller 180 can transmit a control signal to the external device matching the location A. If the pendant part 503 is moved to the location B, the controller 180 can transmit a control signal to the external device matching the location B.

According to the FIG. 15 embodiment, the control signals 1501 and 1502 are transmitted. One example of a control signal may be described with respect to FIG. 16.

Figure 16:
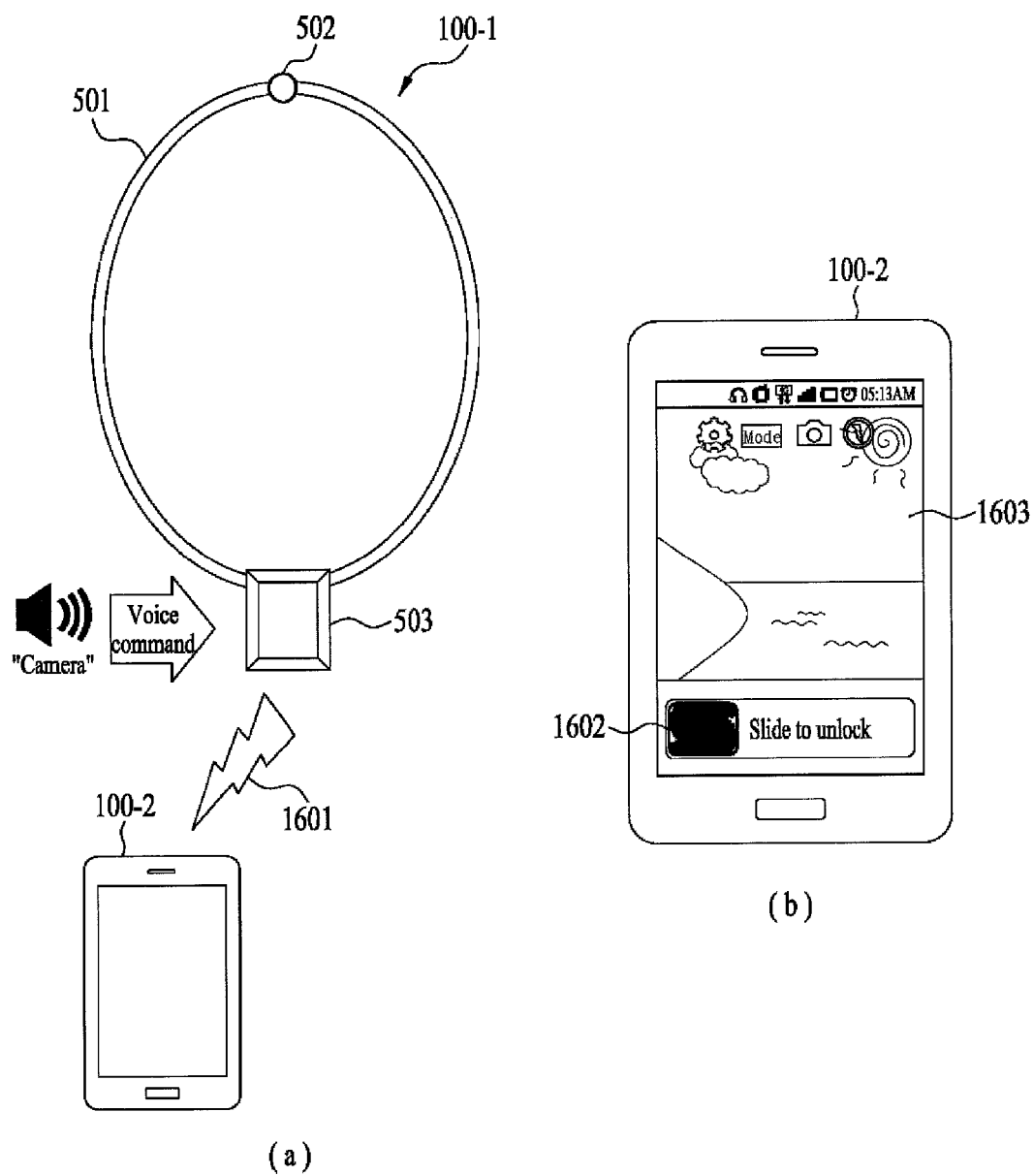
FIG. 16 is a diagram for one example of a control signal transmitted to another mobile terminal connected to a necklace type mobile terminal according to one example embodiment.

FIG. 16 is a diagram for one example of a control signal transmitted to another mobile terminal connected to a necklace type mobile terminal according to one example embodiment. In FIG. 16 (a), assume that a necklace type mobile terminal 100-1 and a first external device 100-2 are connected to each other. A display of the first external device 100-2 is assumed to be locked.

If a voice command 'Camera' is received, the necklace type mobile terminal 100-1 can transmit a control command 1601 for activating the camera 121 to the first external device 100-2. The reason for this is that the camera 121 may be generally deactivated in a locked state of a display or in standby mode.

FIG. 16 (b) is a diagram of a configuration of the first external device 100-2 having received the control command 1601. Referring to FIG. 16 (b), the first external device 100-2 can control a preview screen for an image, which is received through the activated camera module 121, to be outputted together with a lock screen. In order to enter a photographing mode through the first external device 100-2, a display is unlocked and a camera application is then run. It may be advantageous in that the photographing mode can be easily entered using a simple voice command. Since the photographing mode can be entered by keeping the first external device 100-2 locked in a manner of outputting the lock screen of the first external device 100-2 together, the embodiment may be useful.

In order to take a photo in the state shown in FIG. 16 (b), a photo may be taken through an additional voice command. In particular, if a voice command 'photograph' or 'camera' is received through the necklace type mobile terminal 100-1, it is able to control a photographing control signal to be transmitted to the first external device 100-2. After a microphone of the first external device 100-2 has been activated, a voice command to be directly inputted through the activated microphone may be controlled. Furthermore, it is apparent that a photo can be taken in a manner of selecting a photographing touch icon displayed after unlocking the display of the first external device 100-2.

The method of controlling the necklace type mobile terminal 100 has been described. In order to assist the controlling method, it may require information that is fed back to a user. Therefore, a feedback, provided to a user depending on a prescribed state of a necklace type mobile terminal 100, may be described as follows.

Figure 17:
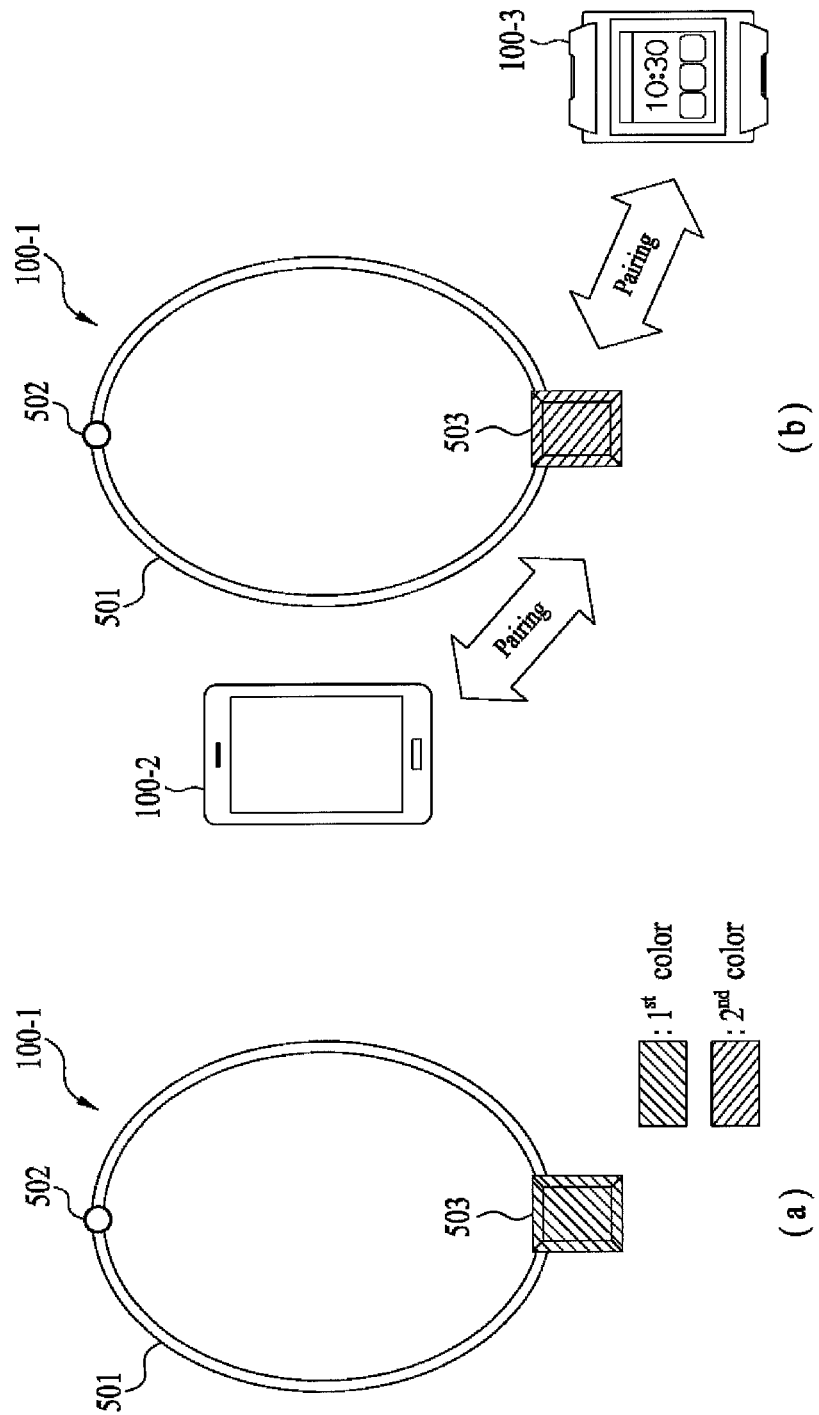
FIG. 17 is a diagram for one example of a feedback provided to a user in case of connecting a necklace type mobile terminal to another mobile terminal according to one example embodiment.

FIG. 17 is a diagram for one example of a feedback provided to a user in case of connecting a necklace type mobile terminal 100-1 to another mobile terminal according to one example embodiment. Other embodiments and configurations may also be provided.

Referring to FIG. 17 (a), there is no other external device connected to the necklace type mobile terminal 100-1. The pendant part 503 of the necklace type mobile terminal 100-1 may be represented in a first color. In FIG. 17 (b), the necklace type mobile terminal 100-1 is assumed as paired with different external devices 100-2 and 100-3. In order to inform a user that the necklace type mobile terminal 100-1 is paired with the different external devices 100-2 and 100-3, the controller 180 can control the pendant part 503 to be outputted in a manner of changing a color of the pendant part 503 to a second color. According to the FIG. 17 example, the color of the pendant part 503 is changed. However, the pendant part 503 may be displayed in different manners.

FIG. 18 is a diagram for one example of a method of showing a success/failure in voice recognition to a user according to one example embodiment. Other embodiments and configurations may also be provided.

FIG. 18 (a) shows color patterns 1801 to 1803 of the pendant part 503 that changes in accordance with voice recognition success. FIG. 18 (b) shows color patterns 1804 to 1806 of the pendant part 503 that changes in accordance with voice recognition failure.

A color of the pendant part 503 may change in accordance with a voice recognition process and a color change for a failure/success in voice recognition may be identified. Therefore, a user can confirm a process level of the voice recognition and the success/failure in the voice, recognition through the color change of the pendant part 503.

The color change of the pendant part 503 is just one example. Embodiments may be applicable through visual identification by other display methods.

A method of providing a feedback to a user using vibration may be provided as well as the visual identification. Such an embodiment may be described with respect to FIGS. 19a to 21.

Figure 19B:
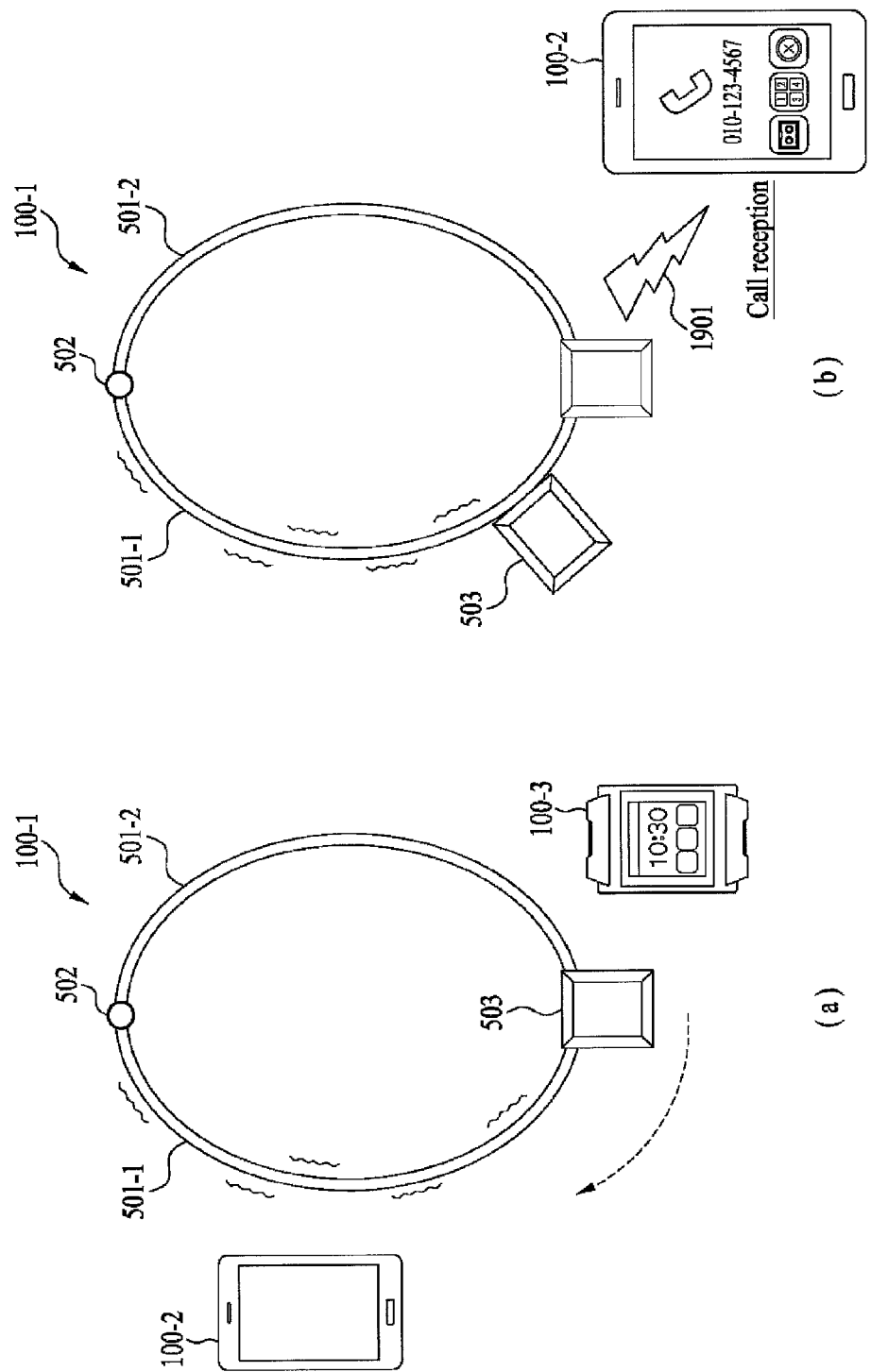

FIG. 19a and FIG. 19b are diagrams for one example of a feedback method using vibration of a necklace strap in a necklace type mobile terminal 100-1 according to one example embodiment. According to FIG. 19a and FIG. 19b, a necklace strap 501 can vibrate to alarm a user. The necklace strap 501 may vibrate in a manner of discriminating a left side 501-1 (of the necklace strap 501) from a right side 501-2 (of the necklace strap 501).

In FIG. 19a (a) and FIG. 19a (b), assume that the necklace type mobile terminal 100-1 is currently connected to a first external device 100-2 and a second external device 100-3. If a prescribed alarm (e.g., a phone call signal, etc.) is received through the first external device 100-2 and the alarm is delivered to the necklace type mobile terminal 100-1, referring to FIG. 19a (a), the controller 180 may control the necklace strap 501-1, which corresponds to a direction of the first external device 100-2, to vibrate. On the other hand, if a prescribed alarm (e.g., a phone call signal, etc.) is received through the second external device 100-3 and the alarm is delivered to the necklace type mobile terminal 100-1, referring to FIG. 19a (b), the controller 180 may control the necklace strap 501-2, which corresponds to a direction of the second external device 100-3, to vibrate.

A user can determine that the alarm corresponding to the vibration is received through which one of the external devices depending on the vibrating location in the necklace strap 501. In the following description, when the above-described alarm is received, one example of a method of responding to the alarm is described with reference to FIG. 19b.

FIG. 19b (a) shows a state that the necklace type mobile terminal 100-1 is currently connected to the first external device 100-2 and the second external device 100-3. Assume that a prescribed alarm (e.g., a call signal) is received through the first external device 100-2. As discussed above with respect to FIG. 19a, the necklace strap 501-1 corresponding to the direction of the first external device 100-2 can vibrate. If an input of sliding to move the pendant part 503 in the vibrating necklace strap 501-1 is received, the controller 180 may respond to the prescribed alarm through the first external device 100-2. More particularly, the controller 180 can transmit a control signal to the first external device 100-2 in response to the prescribed alarm. If the prescribed alarm is a reception of a call signal, the corresponding response may include a response to the call signal.

In the feedback using the above discussed vibration, a size of information may be adjusted based on range of the vibration. Such an embodiment is described with respect to FIG. 20.

FIG. 20 is a diagram for one example of a method of adjusting a range of vibration of a necklace strap in proportion to a size of information intended to be guided to a user according to one example embodiment. Other embodiments and configurations may also be provided.

Referring to FIGS. 20 (a) to 20 (c), a strength of vibration of a left necklace strap 501-1 may increase from a first step to a third step. The controller 180 can increase the strength of the vibration in response to a size of information that is going to be guided to a user. The vibration range of the left necklace strap 501-1 (shown in FIG. 20 (*a*)), which corresponds to a range of a first step vibration, is represented as a partial region of a pendant part 503. As the vibration range proceeds to the third step from the second step, the vibration region of the necklace strap 501-1 gradually increases.

According to the embodiment of FIG. 20, it is advantageous that a user can estimate a prescribed size of the alarmed information.

Figure 21:
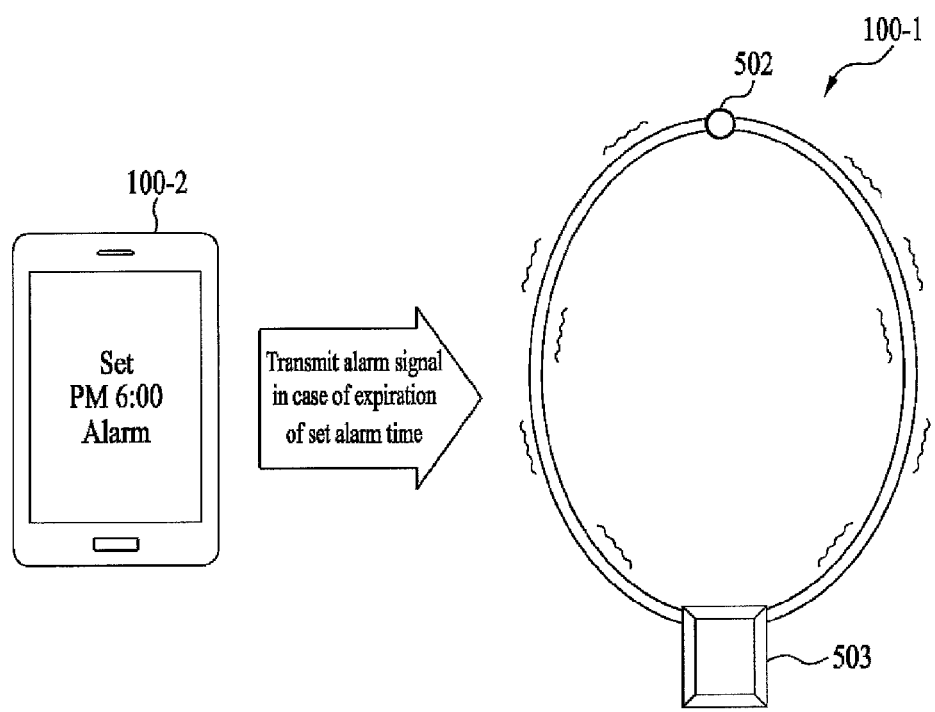
FIG. 21 is a diagram for one example of a guiding method using a vibration of a necklace strap in case of receiving an alarm signal from a first external device connected to a necklace type mobile terminal according to one example embodiment.

FIG. 21 is a diagram for one example of a guiding method using a vibration of a necklace strap 501 in case of receiving an alarm signal from a first external device 100-2 connected to a necklace type mobile terminal 100-1 according to one example embodiment. Other embodiments and configurations may also be provided.

Referring to FIG. 21, if an alarm time set in the first external device 100-1 arrives, the controller 180 (of the necklace type mobile terminal 100-1) can receive an alarm control signal from the first external device 100-2. Having received the alarm control signal, the controller 180 can deliver an alarm signal to a user by controlling the necklace strap 501 to vibrate.

The first external device 100-2 may be carried in a manner of being put into a pocket or bag by a user. It may happen that the user misses an alarm signal. However, if an alarm is received through the vibration of the necklace strap 501, it is advantageous in receiving a highly reliable alarm signal.

If the necklace type mobile terminal 100-1 is taken off, it is impossible to apply the above-described methods. It may be more effective to utilize a mobile terminal of a general type. According to one embodiment, if it is detected that the necklace type mobile terminal 100-1 is taken off, it is proposed to deliver information saved in the necklace type mobile terminal 100-1 to a mobile terminal of a general type in response to the detection of taking off the necklace type mobile terminal 100-1. Such an embodiment is described with respect to FIG. 22.

Figure 22:
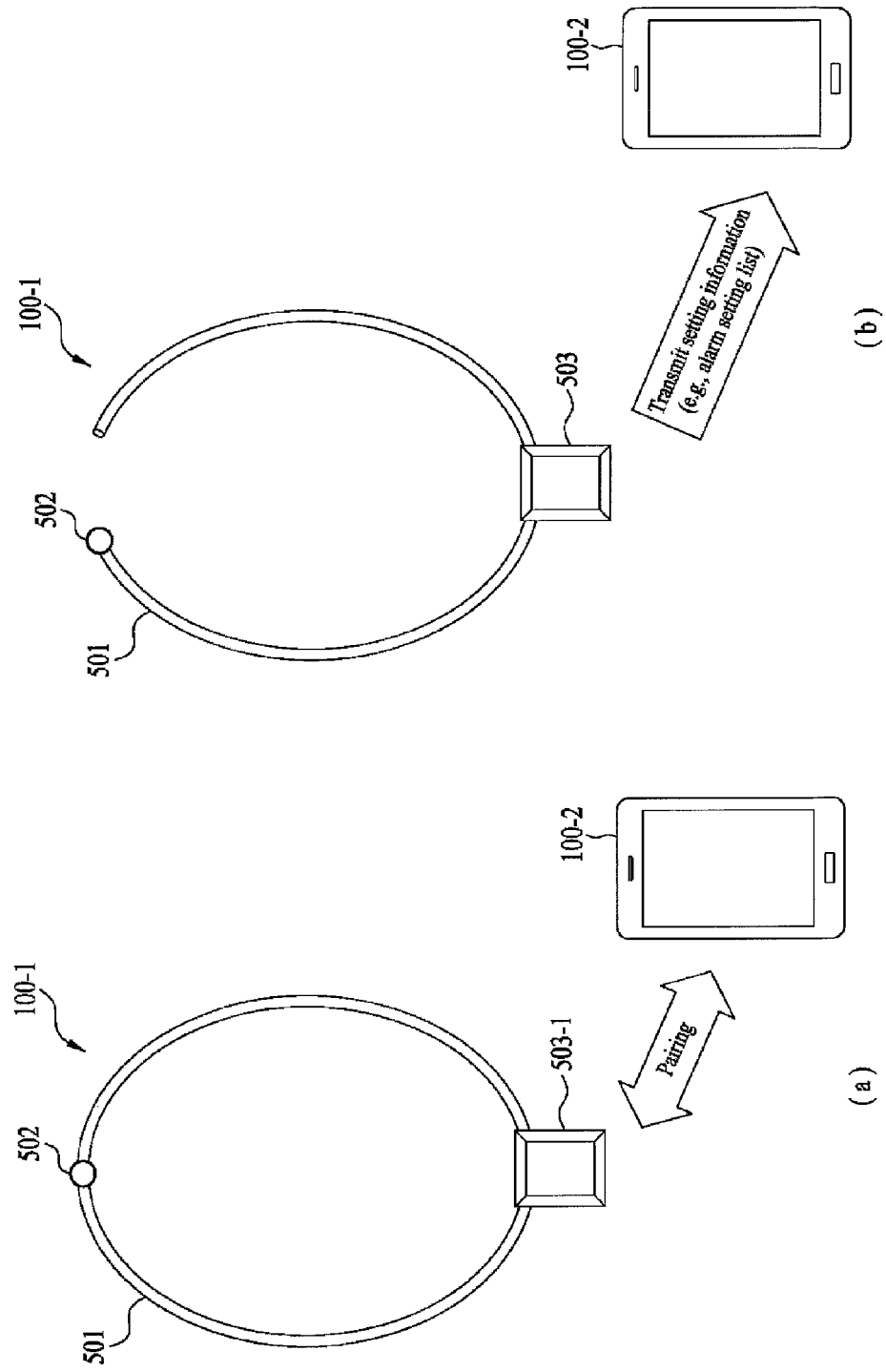
FIG. 22 is a diagram for a method of delivering information in case of taking off a necklace type mobile terminal according to one example embodiment.

FIG. 22 is a diagram for a method of delivering information in case of taking off a necklace type mobile terminal 100-1 according to one example embodiment. Other embodiments and configurations may also be provided.

Referring to FIG. 22 (*a*), assume that the necklace type mobile terminal 100-1 and the first external device 100-2 are paired with each other. While the necklace type mobile terminal 100-1 and the first external device 100-2 are paired with each other, if it is detected that the necklace type mobile terminal 100-1 is taken off, the controller 180 can control at least one setting information saved in the necklace type mobile terminal 100-1 to be transmitted to the first external device 100-2 [FIG. 22 (*b*)]. In this case, the at least one setting information can include at least one of a set alarm list, a saved voice memo and a saved contact list.

Figure 23:
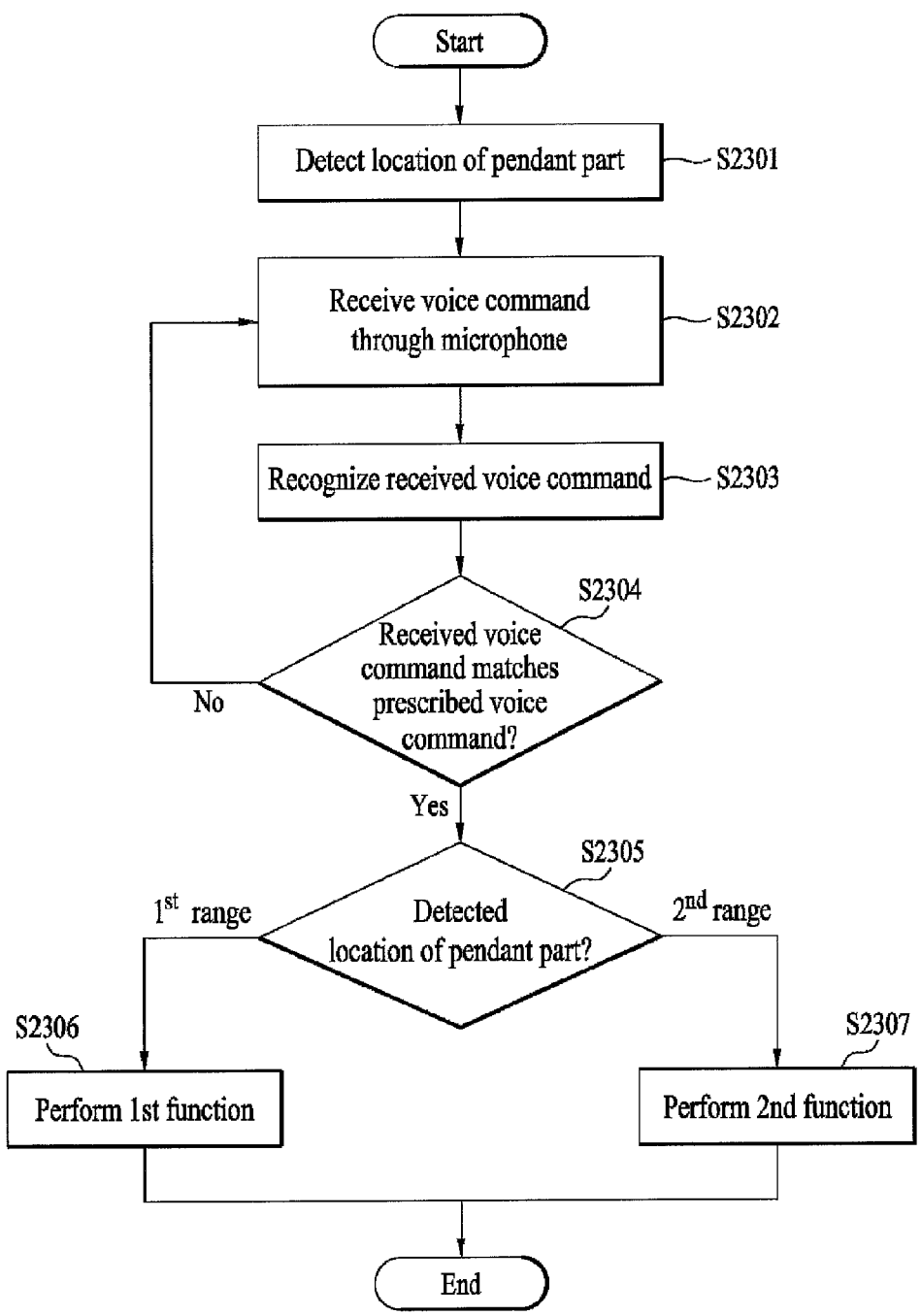
FIG. 23 is a flowchart of a first method of performing a different function depending on a location of a pendant part in response to a recognition of a same voice command in a mobile terminal of a necklace type having the pendant part according to one example embodiment.

FIG. 23 is a flowchart of a first method of performing a different function depending on a location of a pendant part 503 in response to a recognition of a same voice command in a mobile terminal 100 of a necklace type having the pendant part 503 according to one example embodiment. Other embodiments and configurations may also be provided.

Referring to FIG. 23, in operation S2301, the controller 180 detects a location of the pendant part 503. In operation S2302, the controller 180 receives a voice command from a user through the microphone 122. In operation S2303, the controller 180 recognizes the user's voice command received in the operation S2302. In operation S2304, the controller 180 determines whether the received voice command matches a prescribed voice command. As a result of the determination, if the received voice command does not match the prescribed voice command, the controller 180 can go back to the operation S2302. As a result of the determination, if the received voice command matches the prescribed voice command, the controller 180 can go to operation S2305.

In the operation S2305, if the location is included in a first range in accordance with the detected location of the pendant part 503, the controller 180 goes to operation S2306. In the operation S2305, if the location is included in a second range in accordance with the detected location of the pendant part 503, the controller 180 goes to operation S2307. In the operation S2306, the controller 180 performs a first function of the mobile terminal 100 and then ends the routine. In the operation S2307, the controller 180 performs a second function of the mobile terminal 100 and then ends the routine.

Figure 24:
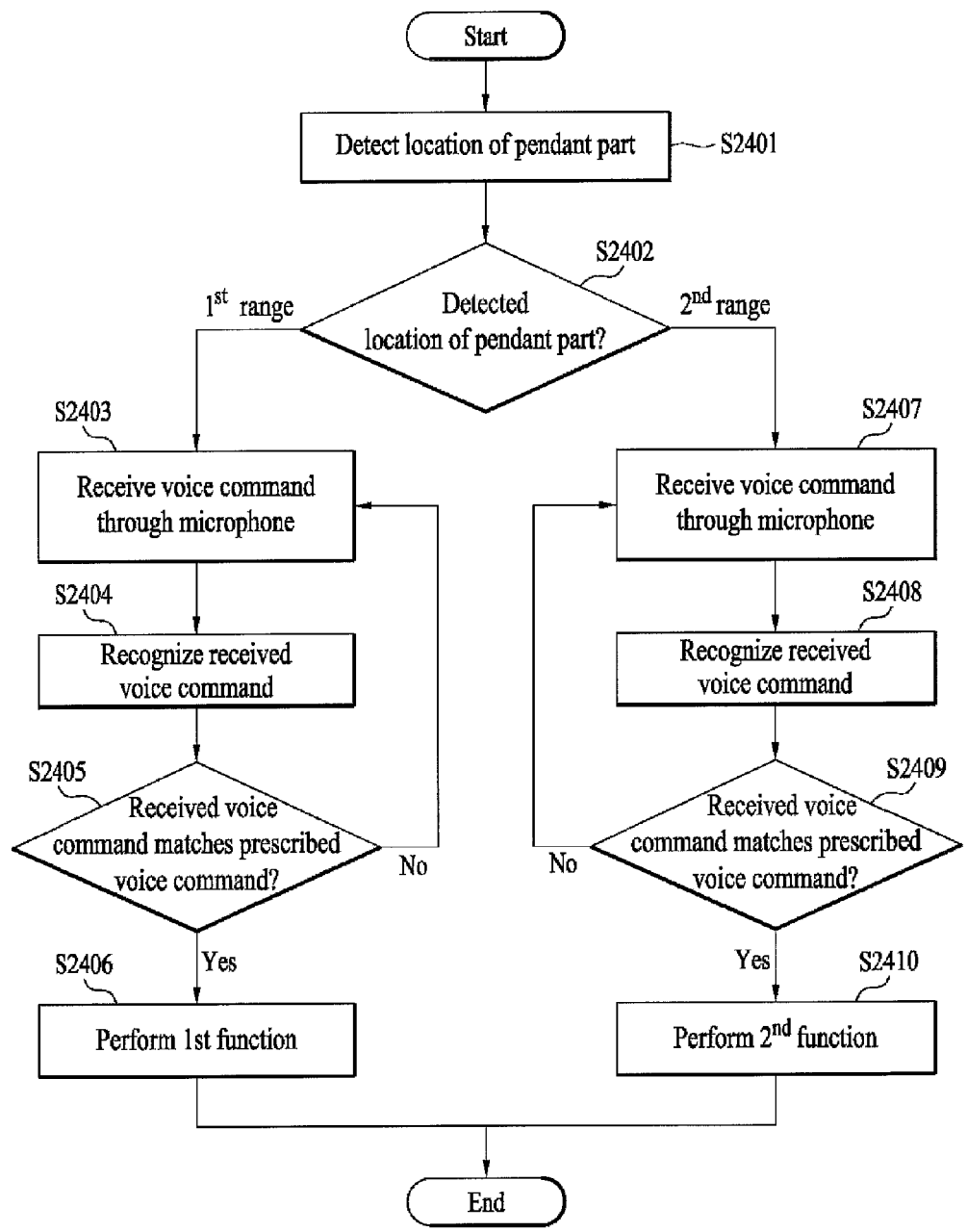
FIG. 24 is a flowchart of a second method of performing a different function depending on a location of a pendant part in response to a recognition of a same voice command in a mobile terminal of a necklace type having the pendant part according to one example embodiment.

FIG. 24 is a flowchart of a second method of performing a different function depending on a location of a pendant part 503 in response to a recognition of a same voice command in a mobile terminal 100 of a necklace type having the pendant part 503 according to one embodiment. Other embodiments and configurations may also be provided.

Referring to FIG. 24, in operation S2401, the controller 180 detects a location of the pendant part 503. In operation S2402, if the location is included in a first range in accordance with the detected location of the pendant part 503, the controller 180 goes to operation S2403. In the operation S2402, if the location is included in a second range in accordance with the detected location of the pendant part 503, the controller 180 goes to operation S2404.

In the operation S2403, the controller 180 receives a voice command from a user through the microphone 122. In operation S2404, the controller 180 recognizes the user's voice command received in the operation S2403. In operation S2405, the controller 180 determines whether the received voice command matches a prescribed voice command. As a result of the determination, if the received voice command does not match the prescribed voice command, the controller 180 can go back to the operation S2403. As a result of the determination, if the received voice command matches the prescribed voice command, the controller 180 can go to operation S2406.

In the operation S2406, the controller 180 performs a first function of the mobile terminal 100 and then ends the routine.

In operation S2407, the controller 180 receives a voice command from a user through the microphone 122. In operation S2408, the controller 180 recognizes the user's voice command received in the operation S2407. In operation S2409, the controller 180 determines whether the received voice command matches a prescribed voice command. As a result of the determination in the operation S2409, if the received voice command does not match the prescribed voice command, the controller 180 can go back to the operation S2407. As a result of the determination in the operation S2409, if the received voice command matches the prescribed voice command, the controller 180 can go to operation S2410.

In operation S2410, the controller 180 performs a second function of the mobile terminal 100 and then ends the routine. According to the above-described embodiment, the controlling method may accurately recognize a voice command from a user. According to another embodiment, a controlling method may minimize a waste of power consumption through a different sensing operation.

According to one embodiment, while at least one function and/or module is deactivated, if a prescribed region (e.g., a pendant) of the mobile terminal 100 is touched, the deactivated at least one function and/or module may be activated.

In particular, during everyday life of a user wearing the necklace type mobile terminal 100, it is able to prevent a waste of power by deactivating functions different from such a basic function as a call signal reception of the mobile terminal 100, a message reception of the mobile terminal 100 and the like. If the user intends to utilize the deactivated different functions, the user can touch a prescribed region of the mobile terminal 100 to activate and use the deactivated different functions.

As mentioned in the foregoing descriptions with respect to FIG. 7 and FIG. 8, when activation/deactivation is controlled by simply touching a prescribed region of the mobile terminal 100, malfunction may possibly occur. The reason for this is that the touch may be applied by a body action of a user currently wearing the necklace type mobile terminal 100. Therefore, according to one embodiment, an activation controlling method may be provided using an additional sensing together with the above-described touch recognition. Such an embodiment shall be described in detail with respect to FIG. 25 and FIG. 26.

Figure 26:
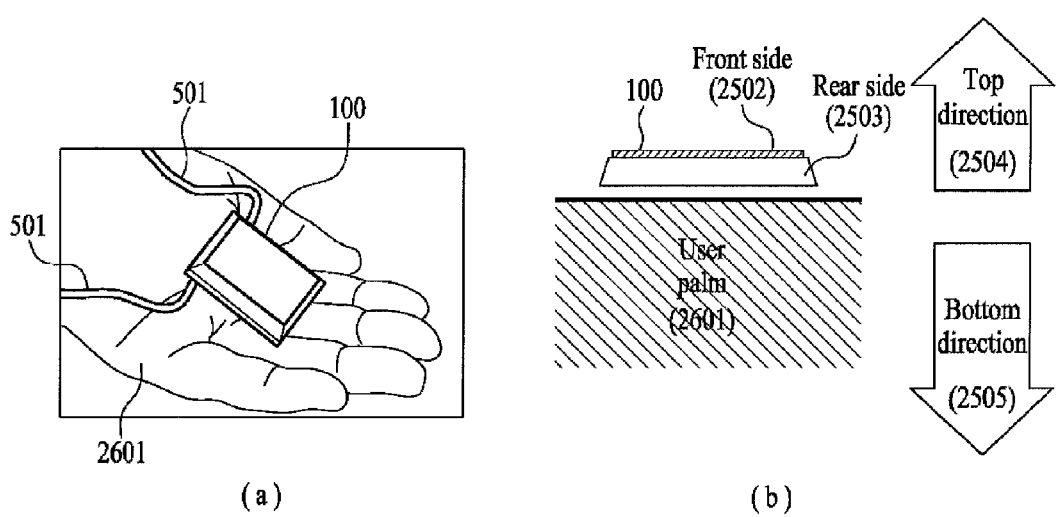

FIG. 25 and FIG. 26 are diagrams for a method of detecting an inclination of a mobile terminal 100 and then reducing waste of power consumption based on a result of the detection according to one example embodiment.

Referring to FIG. 25 (a), a user wears the necklace type mobile terminal 100 through the necklace strap 501. The controller 180 detects inclination of the mobile terminal 100 and is proposed to detect whether the user wears the mobile terminal 100 as shown in FIG. 25 (a). The controller 180 further senses a body temperature of the user and is proposed to detect whether the user currently wears the mobile terminal 100, as shown in FIG. 25 (a), based on the sensed body temperature (or temperature).

FIG. 25 (b) is a bi-sectional diagram of a user's body 2501 and the mobile terminal 100 while the user currently wears the mobile terminal 100 similar to FIG. 25 (a). In order to clarify directions, an arrow indicating a sky direction (i.e., a top direction) 2504 and an arrow indicating a gravity direction (i.e., a bottom direction) 2505 are illustrated in FIG. 25 (b).

In order to describe the embodiment with respect to FIG. 25, the mobile terminal 100 includes a front side 2502 and a rear side 2503.

While the user wears the mobile terminal 100 on user's neck, the front and rear sides 2502 and 2503 of the mobile terminal 100 may incline in parallel with the user's body 2501 (FIG. 25 (b)). The front side 2502 and the rear side 2503 may face a direction vertical to each of the top direction 2504 and the bottom direction 2505 shown in the dragging. A normal vector of the front and rear sides 2502 and 2503 may form an angle closely vertical to each of the top direction 2504 and the bottom direction 2505. Therefore, if an angle between the normal vector of the front side 2502 or the rear side 2503 of the mobile terminal 100 and the gravity direction (or the sky direction) is included in a range of angles close to 90 degrees (e.g., a range between 80 degrees and 100 degrees), the controller 180 can determine that the user currently wears the mobile terminal 100.

According to one embodiment, while the user wears the mobile terminal 100 on user's neck (like the example shown in FIG. 25), the controller 180 may deactivate at least one function or module. The reason for this is described as follows. First of all, if all function and/or modules are always active, it may waste power consumption. If the user simply wears the necklace, it is able to determine that the user just wears the mobile terminal 100 without intention to utilize a prescribed function. The deactivated function or module is proposed to include a voice recognition function and/or the microphone 122. Such a function and/or module may consume a considerable amount of power.

If the angle of the mobile terminal 100 detected through the sensing unit 140 is included in the prescribed angle range (i.e., a first range), the controller 180 can operate to deactivate at least one prescribed function and/or module.

If the user intends to use a prescribed function or module of the mobile terminal 100, the corresponding function or module should be activated. If a prescribed region (e.g., a pendant) of the mobile terminal 100 is touched, the deactivated at least one function and/or module can be activated.

A function may be performed depending on whether a pendant face, which is exposed while a user is wearing a necklace, is a front side 2502 or a rear side 2503. After a prescribed voice command has been received, if the front side 2502 of the pendant is exposed, the controller 180 may perform a first function. On the other hand, if the rear side 2503 of the pendant is exposed, the controller 180 may perform a second function.

In order to identify an exposed face of the pendant, the controller 180 can detect whether the face contacting the user's body is the front side 2502 or the rear side 2503. For instance, in order to identify the user's body contacting face, the controller 180 further includes a temperature detecting sensor provided to each of the front side 2502 and the rear side 2503 and is then able to detect that a face having a relatively higher temperature is the user's body contacting face.

The activation may be performed using inclination of the mobile terminal 100 similar to the example shown in FIG. 25.

FIG. 26 is a diagram for one example of a method of activating a prescribed function or module according to one example embodiment. Other embodiments and configurations may also be provided.

Referring to FIG. 26 (a), a user may provide the mobile terminal 100 on user's hand 2601. A state that the user puts the mobile terminal 100 on his hand may be detected using inclination of the mobile terminal 100. If the user puts the mobile terminal 100 on his hand, the controller 180 may activate at least one function or module.

FIG. 26 (b) is a bi-sectional diagram of a user's hand 2601 and the mobile terminal 100 while the user puts the mobile terminal 100 on his hand similar to FIG. 26 (a). In order to clarify directions, an arrow indicating a sky direction (i.e., a top direction) 2504 and an arrow indicating a gravity direction (i.e., a bottom direction) 2505 are shown in FIG. 26 (b).

In order to describe the embodiment with reference to FIG. 26, the mobile terminal 100 includes a front side 2502 and a rear side 2503.

While the user puts the mobile terminal 100 on his hand, a direction faced by the front side 2502 or the rear side 2503 may include the bottom direction 2505 or the top direction 2504. If a direction of a normal vector of the front side 2502 or the rear side 2503 is included in a prescribed angle range of the top direction 2504 or the bottom direction 2505, the controller 180 may be able to determine that the mobile terminal 100 is put on a hand of the user. If the mobile terminal's angle detected through the sensing unit 140 is included in a second range, the controller 180 can control at least one function or module to be activated.

If a prescribed region of the mobile terminal 100 is touched and the mobile terminal's angle detected through the sensing unit 140 is included in the second range, the controller 180 can control at least one function and/or module to be activated. By detecting both a touch and an inclination, the controller 180 controls at least one function and/or module to be activated.

Whether the front side 2502 faces the top direction 2504 is further determined as well as a state that the mobile terminal 100 is simply placed on a palm and a correspondingly identified function is then performed. Such an embodiment is described with reference to FIG. 27.

According to the example shown in FIG. 27, assume that a necklace type mobile terminal 100-1 is currently connected to a different mobile terminal 100-2. The connection may be a state that data can be transceived in-between by at least one wireless communication technology. The corrected different mobile terminal 100-2 can be named a paired mobile terminal 100-2.

FIG. 27 is a diagram for one example of a method of performing a different function depending on whether a front or rear side of a mobile terminal 100 faces upward according to one example embodiment. Other embodiments and configurations may be provided.

In the example shown in FIG. 27, assume that a necklace type mobile terminal 100-1 is currently connected to a different mobile terminal 100-2. The connection may be a state that data can be transceived in-between by at least one wireless communication technology. The corrected different mobile terminal 100-2 can be called a paired mobile terminal 100-2.

Referring to FIG. 27 (*a*), the mobile terminal 100 is placed on a user's hand 2601 in a manner that a front side 2502 of the mobile terminal 100 faces upward. According to one embodiment described with respect to FIG. 27, a state of placing the mobile terminal 100 on a user's palm is taken as an example, although embodiments are not limited. In particular, after an inclining state of the mobile terminal 100 has been detected, the following embodiments can be applied based on a result of the detection.

As mentioned in the foregoing description with reference to FIG. 26, in case of the state shown in FIG. 27 (*a*), the controller 180 can activate at least one function or module. In the example shown in FIG. 27, assume that a voice recognition function is activated. If a voice command 'phone' is received in the state shown in FIG. 27 (*a*), the controller 180 analyzes the voice command 'phone' using the voice recognition function. The controller 180 may then transmit the analyzed voice command 'phone' to the paired mobile terminal 100-2. According to one embodiment, in response to the delivered voice command 'phone', the paired mobile terminal 100-2 can transmit a call signal to a prescribed counterpart while a display 151 of the paired mobile terminal 100-2 is turned on [first function] (FIG. 27 (*b*)).

Referring to FIG. 27 (*c*), the mobile terminal 100 is placed on a user's hand 2601 in a manner that a rear side 2503 of the mobile terminal 100 faces upward. If a voice command 'phone' is received in the state shown in FIG. 27 (*c*), the controller 180 analyzes the voice command 'phone' using the voice recognition function. The controller 180 then transmits the analyzed voice command 'phone' to the paired mobile terminal 100-2. According to one embodiment, in response to the delivered voice command 'phone', the paired mobile terminal 100-2 can transmit a call signal to a prescribed counterpart while a display 151 of the paired mobile terminal 100-2 is turned off [second function] (FIG. 27 (*d*)). The difference from FIG. 27 (*b*) lies between the call signal transmission in the display-on state and the call signal transmission in the display-off state. According to one embodiment, the first function performed in case of the front side 2502 facing upward may include a function performed in the display-on state. The second function performed in case of rear front side 2503 facing upward may include a function performed in the display-off state.

Although association may exist between the first function and the second function in the call signal transmission, the first function and the second function may be combined into a function having no association in-between. For example, in case that a name of a prescribed counterpart saved in a contact list is recognized as a voice command, the first function and the second function may include at least one of a function of making an outgoing call to the prescribed counterpart (i.e., transmitting a call signal to the prescribed counterpart), a function of sending a text message to the prescribed counterpart, and a function of searching a saved contact list for a contact of the prescribed counterpart. For another example, if a specific time is recognized as a voice command, the first function and the second function may include at least one of a function of searching information with the specific time and a function of setting a notification for the specific time.

According to another embodiment, a runnable function may be matched in further consideration of an inclination of the mobile terminal 100. Such an embodiment is described with respect to FIG. 28 and FIG. 29.

Figure 28:
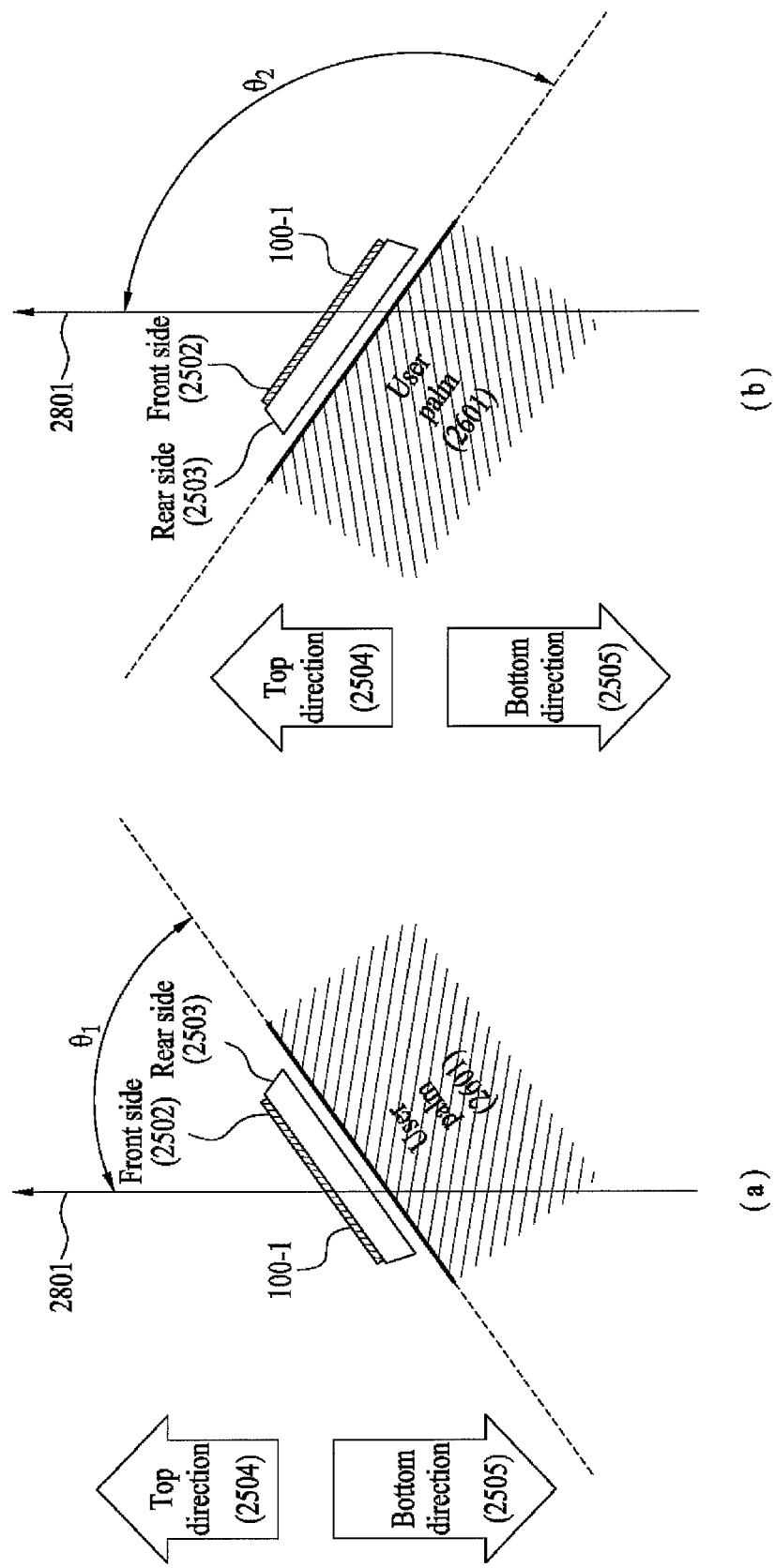
FIG. 28 and FIG. 29 are diagrams for a method of activating a discriminated function in response to an inclination level of a mobile terminal put on a user's palm according to one example embodiment.
Figure 29:
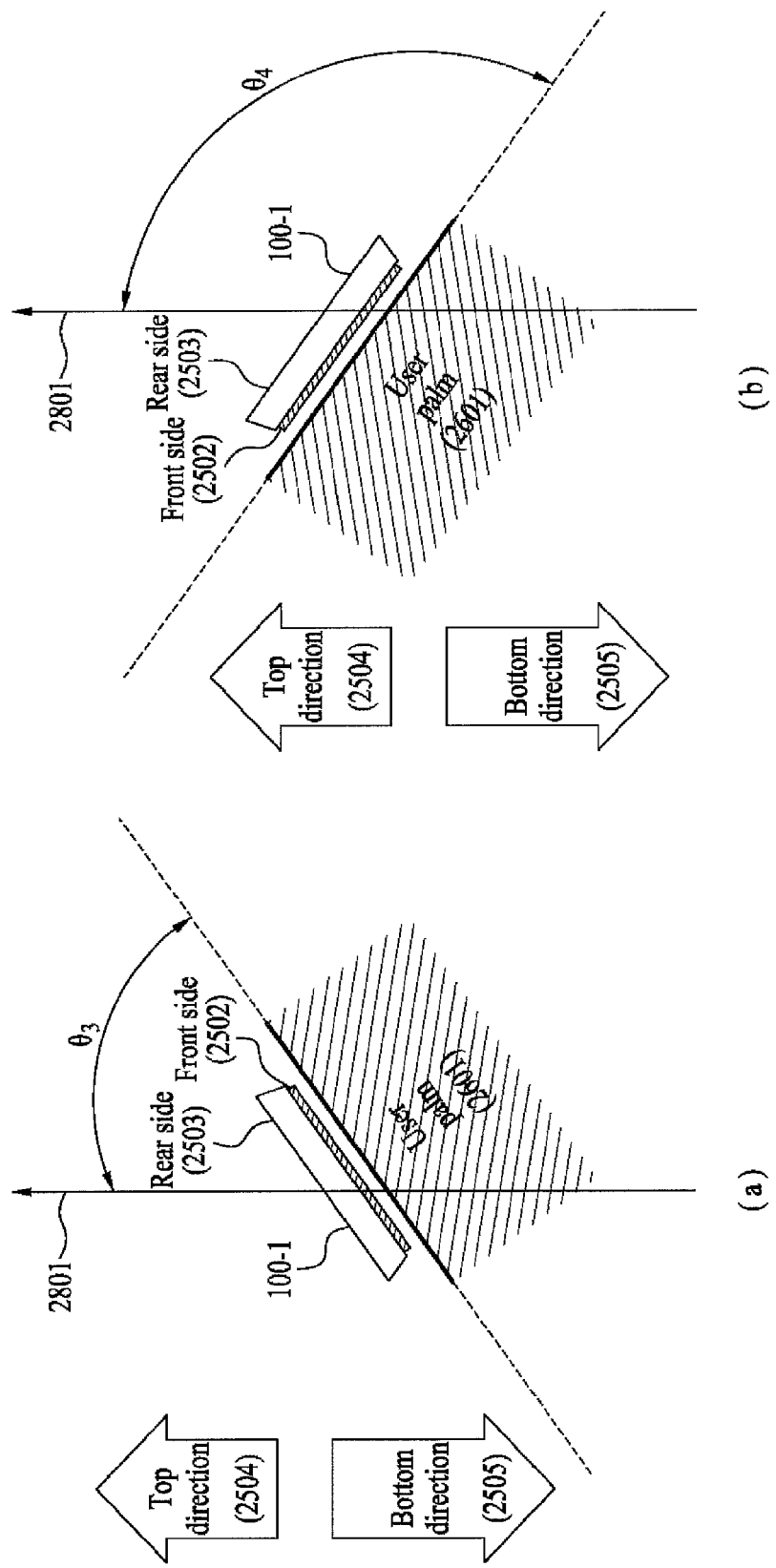

FIG. 28 and FIG. 29 are diagrams for a method of activating a discriminated function in response to an inclination level of a mobile terminal 100 put on a user's palm according to one example embodiment. Other embodiments and configurations may also be provided.

Referring to FIG. 28 (*a*) and FIG. 28 (*b*), while the front side 2502 of the mobile terminal 100 faces upward, a user is inputting a prescribed voice command in a state of an inclination at a prescribed angle.

Referring to FIG. 29 (*a*) and FIG. 29 (*b*), while the rear side 2503 of the mobile terminal 100 faces upward, a user is inputting a prescribed voice command in a state of an inclination at a prescribed angle.

According to one embodiment, in case of receiving voice command in one of the states shown in FIG. 28 (*a*), FIG. FIG. 28 (*b*), FIG. 29 (*a*) and FIG. 29 (*b*), it is proposed to perform a different function. Since a function runnable by a voice command has limitation put on its diversity, functions are identified or discriminated using this method.

The controller may divide a range of the angle of the mobile terminal 100 by a prescribed number and then perform a function corresponding to an angle range to which a detected angle formed with a reference angle 2801 of the mobile terminal 100 belongs. For example, in response to a voice command 'phone', if the detected angle belongs to a first range like the state shown in FIG. 28 (*a*), the controller 180 is able to make a phone call to a preset 'first character'. If the detected angle belongs to a second range like the state shown in FIG. 28 (*b*), the controller 180 is able to make a phone call to a preset 'second character'. In response to a voice command 'watch', if the detected angle belongs to a third range like the state shown in FIG. 29 (*a*), the controller 180 is able to operate to output a current hour. If the detected angle belongs to a fourth range like the state shown in FIG. 29 (*b*), the controller 180 is able to activate a preset timer. Operations and voice commands matched to the respective states are non-limited by the above examples. Various functions may be matched to the respective states.

Figure 30:
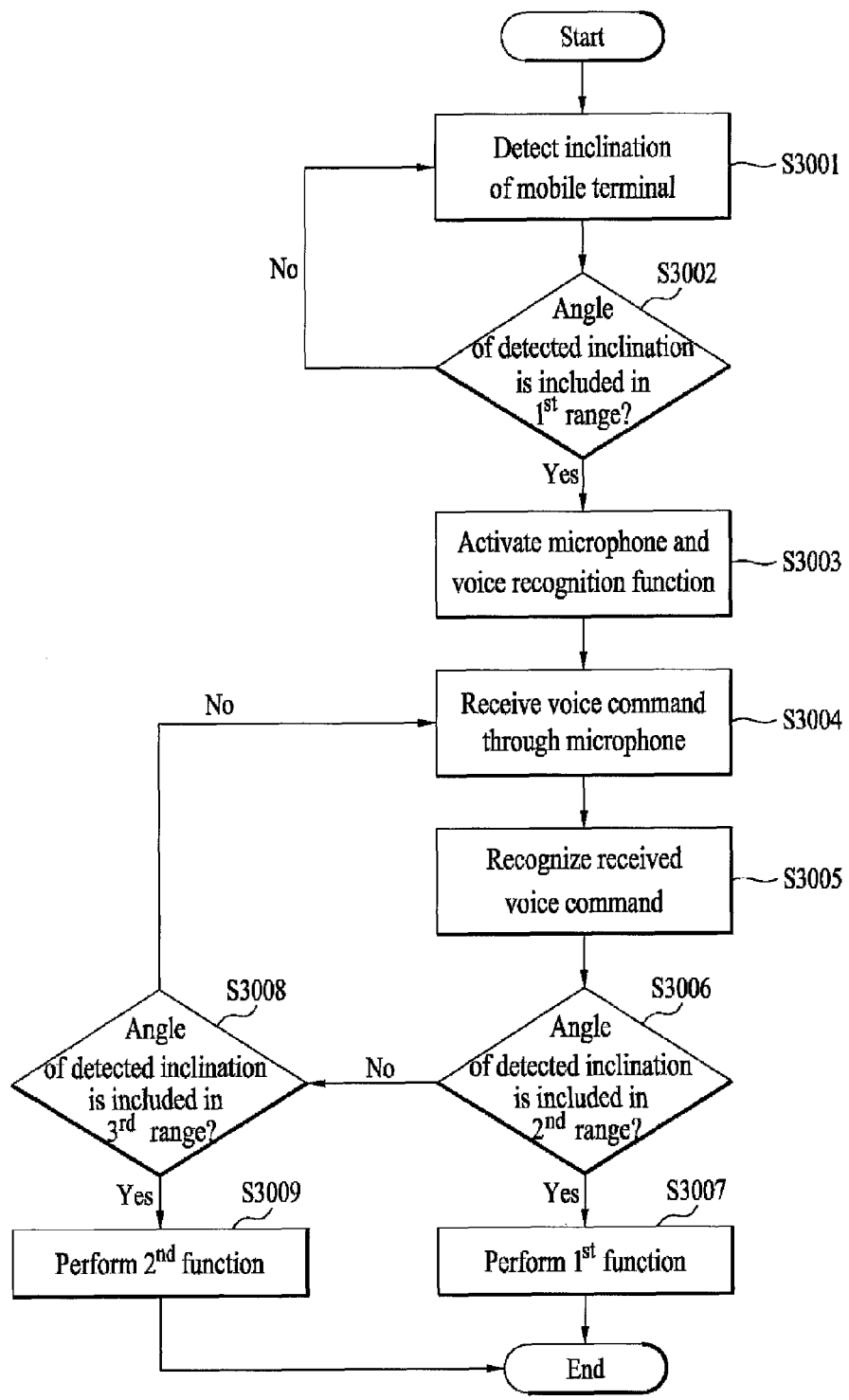
FIG. 30 is a flowchart of a function or module activating method and a function running method according to one example embodiment.

FIG. 30 is a flowchart of a function or module activating method and a function running method according to one example embodiment. Other embodiments and configurations may also be provided.

Referring to FIG. 30, in operation S3001, the controller 180 can detect an inclination of the mobile terminal 100 through the sensing unit 140. In operation S3002, the controller 180 goes to operation S3003 if a level of the detected inclination in the operation S3001 is included in a first range. If the detected inclination level is not included in the first range, the controller 180 goes back to the operation S3001.

In the operation S3003, the controller 180 activates the microphone 122 and the voice recognition function. In operation S3004, the controller 180 receives a voice command through the microphone 122. In operation S3005, the controller 180 recognizes the received voice command.

In operation S3006, the controller 180 determines whether an angle of the mobile terminal 100 is included in a second range. If included, the controller 180 can perform a first function (S3007). If not included, the controller 180 determines whether the angle of the mobile terminal 100 is included in a third range. If included, the controller 180 can perform a second function (S3008). In not included, the controller 180 can operate to return to the operation S3004.

Embodiments may provide various effects and/or features.

According to at least one embodiment, the mobile terminal and controlling method can be provided by enhancing portability.

According to at least one embodiment, convenience in controlling a mobile terminal of a necklace type can be enhanced.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and may also include carrier-wave type implementations (e.g., transmission via Internet). The computer can include the control unit 180 of the terminal.

Embodiments may be directed to a mobile terminal and controlling method thereof that substantially obviate one or more problems due to limitations and disadvantages of related art.

One object is to provide a mobile terminal and controlling method thereof, by which facilitation of a user command input/output and portability may be further enhanced.

One object is to provide a mobile terminal and controlling method thereof, by which accuracy of a user input can be improved.

Technical tasks obtainable from embodiments may be non-limited by the above-mentioned technical tasks. Other unmentioned technical tasks can be clearly understood from the description by those having ordinary skill in the technical field to which the embodiment pertains.

A mobile terminal of a necklace type may be provided according to one example embodiment. This may include a microphone, a necklace strap configured to be worn on a neck of a user, a pendant part configured to slide to move along the necklace strap by being coupled with the necklace strap, a sensing unit configured to detect a location of the pendant part in accordance with a slide movement of the pendant part, and a controller recognizing a voice command received through the microphone. The controller may perform a first function in response to a first voice command recognized through the microphone if the detected location of the pendant part belongs to a first range, and the controller may perform a second function in response to the first voice command recognized through the microphone if the detected location of the pendant part belongs to a second range.

A method may be provided of controlling a mobile terminal that includes a microphone, a necklace strap configured to be worn on a neck of a user, and a pendant part configured to slide to move along the necklace strap by being coupled with the necklace strap. The method may include detecting a location of the pendant part in accordance with a slide movement of the pendant part, recognizing a voice command received through the microphone, performing a first function in response to a first voice command recognized through the microphone if the detected location of the pendant part belongs to a first range, and performing a second function in response to the first voice command recognized through the microphone if the detected location of the pendant part belongs to a second range.

It is to be understood that both detailed description of preferred embodiments are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal of a necklace type, comprising:
a microphone;
a necklace strap to be provided on a user;
a pendant part configured to move along the necklace strap;
a sensing unit configured to detect a location of the pendant part based on a movement of the pendant part; and
a controller to recognize a voice command received through the microphone, the controller to perform a first function in response to a first voice command received through the microphone when the detected location of the pendant part is within a first range, and the controller to perform a second function in response to the first voice command received through the microphone when the detected location of the pendant part is within a second range.

2. The mobile terminal of claim 1, wherein the controller determines a type of a second voice command in response to a second voice command received through the microphone, wherein the controller to execute a prescribed application based on the determined type, and wherein the type includes at least one selected from the group consisting of a word type, a numeral type and a time type.

3. The mobile terminal of claim 2, wherein when the determined type is the word type, the controller to execute a phone transceiving application and to transmit a call signal to a call counterpart corresponding to the recognized second voice command.

4. The mobile terminal of claim 2, wherein when the determined type is the time type, the controller to execute an alarm setting application and to set an alarm for an alarm setting time corresponding to the recognized second voice command.

5. The mobile terminal of claim 1, further comprising a length adjusting part configured to adjust a length of the necklace strap,
- wherein in response to a third voice command, when the length of the necklace strap adjusted by the length adjusting part is within a third range, the controller to perform a third function, and
- wherein in response to the third voice command, when the length of the necklace strap adjusted by the length adjusting part is within a fourth range, the controller to perform a fourth function.

6. The mobile terminal of claim 5, further comprising a wireless communication unit configured to establish connections to a plurality of external devices, wherein the controller establishes the connections to a plurality of the external devices through the wireless communication unit,
- wherein when the length of the necklace strap adjusted by the length adjusting part is within the third range, the controller to establish the connection to a first external device, and
- wherein when the length of the necklace strap adjusted by the length adjusting part is within the fourth range, the controller to establish the connection to a second external device.

7. The mobile terminal of claim 1, further comprising a wireless communication unit configured to establish connections to a plurality of external devices, wherein the controller establishes the connections to a plurality of the external devices through the wireless communication unit,
- wherein when the detected location of the pendant part is within the first range, the controller to transmit a control signal to a third external device, and
- wherein when the detected location of the pendant part belongs to the second range, the controller to transmit the control signal to a fourth external device.

8. The mobile terminal of claim 1, further comprising a wireless communication unit configured to establish a connection to at least one external device, wherein the controller establishes the connection to the at least one external device through the wireless communication unit, and
- wherein the controller to transmit a control signal to the connected at least one external device in response to a second voice command.

9. The mobile terminal of claim 8, wherein the transmitted control signal includes a command for activating a camera of the connected mobile terminal and outputting a preview screen received through the activated camera.

10. The mobile terminal of claim 1, wherein the sensing unit further to detect an inclination of the mobile terminal, and wherein the controller to control activation of the microphone based on the inclination detected through the sensing unit.

11. The mobile terminal of claim 10, wherein while the microphone is deactivated, when the detected inclination is within a third range, the controller to activate the microphone.

12. The mobile terminal of claim 10, wherein the controller to sequentially recognize a prescribed number of preset voice commands and then to perform a prescribed function corresponding to the sequentially recognized voice commands, and wherein after the prescribed function is performed, the controller to control the microphone to be deactivated.

13. A method of controlling a mobile terminal of a necklace type, the mobile terminal including a microphone, a necklace strap, and a pendant part to move along the necklace strap, the method comprising:
- detecting a location of the pendant part based on a slide movement of the pendant part;
- recognizing a voice command received through the microphone;
- performing a first function in response to a first voice command received through the microphone when the detected location of the pendant part is within a first range; and
- performing a second function in response to the first voice command received through the microphone when the detected location of the pendant part is within a second range.

14. The method of claim 13, further comprising:
- determining a type of a second voice command in response to a second voice command received through the microphone; and
- executing a prescribed application based on the determined type of the second voice command,
- wherein the type includes at least one selected from the group consisting of a word type, a numeral type and a time type.

15. The method of claim 14, further comprising:
- when the determined type is the word type, running a phone transceiving application, and transmitting a call signal to a call counterpart corresponding to the recognized second voice command.

16. The method of claim 14, further comprising:
- when the determined type is the time type, running an alarm setting application, and setting an alarm for an alarm setting time corresponding to the recognized second voice command.

17. The method of claim 13, wherein the mobile terminal further includes a length adjusting part to adjust a length of the necklace strap, wherein in response to a third voice command, when the length of the necklace strap adjusted by the length adjusting part is within a third range, a third function is performed, and wherein in response to the third voice command, when the length of the necklace strap adjusted by the length adjusting part is within a fourth range, a fourth function is performed.

18. The method of claim 17, wherein the mobile terminal further includes a wireless communication unit configured to establish connections to a plurality of external devices, and wherein the method further comprises:
- establishing the connections to a plurality of the external devices through the wireless communication unit,
- when the length of the necklace strap adjusted by the length adjusting part is within the third range, establishing the connection to a first external device, and
- when the length of the necklace strap adjusted by the length adjusting part is within the fourth range, establishing the connection to a second external device.

19. The method of claim 13, wherein the mobile terminal further includes a wireless communication unit configured to establish connections to a plurality of external devices, wherein the method further comprises:
- establishing the connections to a plurality of the external devices through the wireless communication unit,
- when the detected location of the pendant part is within the first range, transmitting a control signal to a third external device, and when the detected location of the pendant part is within the second range, transmitting the control signal to a fourth external device.

20. The method of claim 13, wherein the mobile terminal further includes a wireless communication unit configured to establish a connection to at least one external device, wherein the method further comprises:
   establishing the connection to the at least one external device through the wireless communication unit, and transmitting a control signal to the connected at least one external device in response to a second voice command.

21. The method of claim 20, wherein the transmitted control signal includes a command for activating a camera of the connected mobile terminal and outputting a preview screen received through the activated camera.

22. The method of claim 13, wherein the sensing unit detects an inclination of the mobile terminal, and activation of the microphone is controlled based on the inclination detected through the sensing unit.

* * * * *